(12) United States Patent
Kodama et al.

(10) Patent No.: US 11,498,143 B2
(45) Date of Patent: Nov. 15, 2022

(54) LAP FILLET ARC WELDING JOINT

(71) Applicant: NIPPON STEEL & SUMITOMO METAL CORPORATION, Tokyo (JP)

(72) Inventors: Shinji Kodama, Tokyo (JP); Yoshinari Ishida, Tokyo (JP); Kazuki Matsuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 999 days.

(21) Appl. No.: 16/312,951

(22) PCT Filed: Jul. 4, 2017

(86) PCT No.: PCT/JP2017/024554
§ 371 (c)(1),
(2) Date: Dec. 21, 2018

(87) PCT Pub. No.: WO2018/008655
PCT Pub. Date: Jan. 11, 2018

(65) Prior Publication Data
US 2019/0160575 A1    May 30, 2019

(30) Foreign Application Priority Data
Jul. 6, 2016    (JP) .............................. JP2016-134334

(51) Int. Cl.
*B23K 9/02* (2006.01)
*B23K 9/025* (2006.01)
(Continued)

(52) U.S. Cl.
CPC .............. *B23K 9/02* (2013.01); *B23K 9/0035* (2013.01); *B23K 9/025* (2013.01); *B23K 9/16* (2013.01);
(Continued)

(58) Field of Classification Search
CPC ........ B23K 9/025; B23K 9/0035; B23K 9/02; B23K 9/16; B23K 9/23; B23K 9/24;
(Continued)

(56) References Cited

U.S. PATENT DOCUMENTS

2009/0095720 A1* 4/2009 Kamei .................... B23K 28/02
219/121.64
2011/0023610 A1* 2/2011 Ume .................... G01N 29/4481
73/622

FOREIGN PATENT DOCUMENTS

JP    1-109378 U    7/1989
JP    9-141427 A    6/1997
(Continued)

OTHER PUBLICATIONS

"General rules for fatigue testing of metals", JIS Z 2273, 1978, total 9 pages.
(Continued)

*Primary Examiner* — Dana Ross
*Assistant Examiner* — Joe E Mills, Jr.
(74) *Attorney, Agent, or Firm* — Birch, Stewart, Kolasch & Birch, LLP

(57) ABSTRACT

The present invention provides a lap fillet arc welding joint including a first metal sheet, a second metal sheet, and a weld bead. A region of the first metal sheet on one end side is bent. In a first direction, a position of a tip end of the bent region of the first metal sheet overlaps a region of the second metal sheet on one end side. In a second direction, an amount of deviation between a central axis of a region connected to the bent region of the first metal sheet and a central axis of the region of the second metal sheet on one end side is ½ times or less of average sheet thicknesses of
(Continued)

the first metal sheet and the second metal sheet. A joint portion length is two times or more of the sheet thickness of the second metal sheet.

8 Claims, 11 Drawing Sheets

(51) Int. Cl.
    *B23K 33/00*     (2006.01)
    *B23K 9/235*     (2006.01)
    *B23K 9/00*     (2006.01)
    *B23K 9/16*     (2006.01)
    *B23K 103/04*     (2006.01)

(52) U.S. Cl.
    CPC ............ *B23K 9/235* (2013.01); *B23K 33/004* (2013.01); *B23K 33/008* (2013.01); *B23K 2103/04* (2018.08)

(58) Field of Classification Search
    CPC ................ B23K 9/235; B23K 2101/34; B23K 2103/04; B23K 33/004; B23K 33/008
    See application file for complete search history.

(56) References Cited

FOREIGN PATENT DOCUMENTS

| JP | 2008-55448 A | 3/2008 |
|---|---|---|
| JP | 2016-55659 A | 4/2016 |
| JP | 2017-47446 A | 3/2017 |

OTHER PUBLICATIONS

"Rolled steel for general structure", JIS G 3101, 2010, total 15 pages.
International Search Report for PCT/JP2017/024554 dated Oct. 3, 2017.
Notice of Allowance for JP 2017-557001 dated Dec. 22, 2017.
Written Opinion of the International Searching Authority for PCT/JP2017/024554 (PCT/ISA/237) dated Oct. 3, 2017.
Indian Office Action, dated Dec. 30, 2019, for Indian Application No. 201817048353, with an English translation.

\* cited by examiner (a)

SHAPE IN INITIAL STAGE (b)

SHAPE AFTER BEING DEFORMED DUE TO TENSILE LOAD (c)

DISTRIBUTION OF STRESS (a)

SHAPE IN INITIAL STAGE (b)

SHAPE AFTER BEING DEFORMED DUE TO TENSILE LOAD (c)

DISTRIBUTION OF STRESS (a)

SHAPE IN INITIAL STAGE (b)

SHAPE AFTER BEING DEFORMED DUE TO TENSILE LOAD

TENSION OF 30 MPa (c)

DISTRIBUTION OF STRESS (a)

DISTRIBUTION OF STRESS (b)

DISTRIBUTION OF STRESS (a)

(b)

LAP FILLET ARC WELDING JOINT

TECHNICAL FIELD OF THE INVENTION

The present invention relates to a lap fillet arc welding joint.

Priority is claimed on Japanese Patent Application No. 2016-134334, filed on Jul. 6, 2016, the content of which is incorporated herein by reference.

RELATED ART

For example, in the automobile field, for the sake of environmental conservation, improvement of fuel efficiency through weight reduction in a vehicle body and improvement of collision safety have been required. Therefore, in order to achieve weight reduction of a vehicle body and improvement of collision safety, various countermeasures have been devised until now by using a high strength steel sheet to thin a member adopted in a vehicle body, optimizing the structure of a vehicle body, and the like.

Lap fillet arc welding is often used in automobile suspension members, which are required to have sufficient fatigue strength for bearing forces which repetitively act, in addition to regular static tensile strength. In general lap fillet arc welding, two steel sheets are overlapped such that their sheet surfaces face each other. Then, a weld bead is formed by performing lap fillet arc welding of a region in an end portion of one steel sheet (an end surface and a region in the vicinity thereof) and a region, of the region on the sheet surface of the other steel sheet, in the vicinity of the end portion of one steel sheet thereof.

In the following description, as necessary, the steel sheet on one side will be referred to as an upper sheet, and the metal sheet on the other side will be referred to as a lower sheet.

Usually, fatigue strength of base metals adopted as welding members increases in proportion to the strength of steel sheets. However, it is known that the fatigue strength of a welding member is not necessarily increased even if the strength of a steel sheet is increased. This may be one of the causes hindering weight reduction in a vehicle body using a high strength steel sheet.

Generally, stress concentration to a weld toe portion caused due to the shape of a weld bead is regarded as one of factors which dominate the fatigue strength of welding members. A weld toe portion means a boundary portion on a side where a welding wire is supplied at the time of welding, in a boundary portion between a steel sheet and a weld metal. Since a weld toe portion has a shape with a discontinuous outer surface with respect to a base metal, it is assumed that stress is concentrated on the weld toe portion. Particularly, typical fatigue cracks in lap fillet welding members manufactured by performing lap fillet arc welding are often generated from a weld toe portion of a lower sheet (a lower steel sheet) on which stress is concentrated.

Therefore, the outer surface of a weld toe portion of a lower sheet (a lower steel sheet) is smoothened by performing grinder-finishing or the like to reduce the stress concentration factor of the weld toe portion in the lower sheet (the lower steel sheet), thereby improving the fatigue strength.

In lap fillet welding members frequently adopted in welded structures using a thin steel sheet, the central axis of one steel sheet in the sheet thickness and the central axis of the other steel sheet in the sheet thickness deviate from each other in a sheet thickness direction of the steel sheet. Here, the central axis in the sheet thickness means an axis passing through the center of a steel sheet in the sheet thickness direction and extending in a direction perpendicular to a direction along a weld line of a weld bead and the sheet thickness direction of the steel sheet. In the following description, as necessary, this axis will be referred to as "the central axis in the sheet thickness".

Therefore, when a tensile force is applied to both end portions of a steel sheet, a significant bending moment is applied to a fillet weld, and stress is concentrated on not only a weld toe portion but also a root portion, so that the steel sheet may be fractured. A root portion means a boundary portion on a side opposite to a side where a welding wire is supplied at the time of welding, in a boundary portion between a steel sheet and a weld metal.

Patent Document 1 discloses that lap fillet arc welding is performed in a manner as described below. First, an end portion of one steel sheet (a lower sheet) is bent downward. Next, an end surface of the other steel sheet (an upper sheet) is caused to abut the bent part on a sheet surface of one steel sheet. Then, the abutted part between the steel sheets is subjected to fillet welding. In Patent Document 1, as a result, deviation between the central axes of the steel sheets in the sheet thickness can be reduced and the strength of a welding joint can be improved.

However, in actual members having a welded structure of thin steel sheets, an unintentional gap is often generated between the steel sheets due to spring back caused when the steel sheets are press-formed, or poor combination accuracy before the member is welded. That is, although Patent Document 1 discloses that fillet welding is performed after steel sheets to be welded are caused to abut each other, in actual members having a welded structure, as shown in FIG. 12, welding is often performed in a state where a gap 1230 is present between steel sheets 1210 and 1220.

In addition, according to Patent Document 1, favorable joint strength can be achieved if the amount of deviation in the sheet thickness direction between the central axis of one steel sheet in the sheet thickness having a bent end portion, and the central axis of the other steel sheet in the sheet thickness is ½ or smaller than the average value of the sheet thicknesses of both thereof. Incidentally, the inventors manufactured a lap fillet arc welding joint using two steel sheets, similar to that shown in Patent Document 1 and performed an axial force fatigue test in which a tensile load was applied to both ends of the steel sheets. However, sufficient fatigue strength could not be achieved, and there was a case where the root portion was fractured in an early stage. In Patent Document 1, only the fatigue strength of the weld toe portion was evaluated through a bending fatigue test in which no load is applied to the root portion.

In contrast, in the axial force fatigue test, both the weld toe portion and the root portion became places where stress was concentrated due to the bending moment generated when a load was applied. Therefore, it was assumed that a fracture is generated in the root portion in which the stress concentration factor becomes higher. Here, a case where the metal sheet is a steel sheet has been described as an example. However, those described above similarly apply to a metal sheet other than a steel sheet with which a lap fillet arc welding joint can be manufactured.

PRIOR ART DOCUMENT

Patent Document

[Patent Document 1] Japanese Unexamined Patent Application, First Publication No. H9-141427

DISCLOSURE OF THE INVENTION

Problems to be Solved by the Invention

The present invention has been made in consideration of the problems described above, and an object thereof is to provide a lap fillet arc welding joint in which stress concentrations in a weld toe portion and a root portion are reduced even in a state where a gap is present between metal sheets.

Means for Solving the Problem (1) According to an aspect of the present invention, there is provided a lap fillet arc welding joint including a first metal sheet, a second metal sheet, and a weld bead which is a joint portion of the first metal sheet and the second metal sheet. A region of the first metal sheet on one end side is bent. The weld bead is located in a region including a region between the second metal sheet and the bent region of the first metal sheet. In a cross-sectional view in a cross section perpendicular to a weld line of the weld bead, in a first direction, a position of a tip end of the bent region of the first metal sheet overlaps a region of the second metal sheet on one end side. In a second direction, an amount of deviation between a central axis of a region connected to the bent region of the first metal sheet and a central axis of the region of the second metal sheet on one end side is ½ times or less of the average value of sheet thicknesses of the first metal sheet and the second metal sheet. The first direction is a direction perpendicular to a direction along the weld line of the weld bead and a sheet thickness direction of the second metal sheet, and the second direction is the sheet thickness direction of the second metal sheet. A joint portion length, which is a length from a root portion of the second metal sheet to a weld toe portion of the first metal sheet, is two times or more of the sheet thickness of the second metal sheet. A position of the weld toe portion of the first metal sheet in the second direction is in a range from a first position to a second position. The first position is a position on a sheet surface of the region connected to the bent region of the first metal sheet and is a position on a sheet surface on a side where the weld bead is formed. The second position is a position of the central axis in the second direction in the region connected to the bent region of the first metal sheet.

In a lap fillet arc welding joint having the configuration described above, stress concentrations in a weld toe portion and a root portion are reduced even in a state where a gap is present between metal sheets.

(2) According to another aspect of the present invention, in the lap fillet arc welding joint according to (1), in a cross-sectional view in the cross section perpendicular to the weld line of the weld bead, a bent angle, which is an angle formed by the bent region of the first metal sheet and a sheet surface of the second metal sheet, may be within a range of 10° to 35°. The joint portion length may be within a range of two to four times the sheet thickness of the second metal sheet. A distance between a root portion of the first metal sheet and the root portion of the second metal sheet in the second direction may be equal to or smaller than the sheet thickness of the second metal sheet.

(3) According to another aspect of the present invention, in the lap fillet arc welding joint according to (1) or (2), a representative value of the joint portion length may be two times or more of the sheet thickness of the second metal sheet. The representative value of the joint portion length may be set based on the joint portion lengths in a plurality of cross sections of the lap fillet arc welding joint.

(4) According to another aspect of the present invention, in the lap fillet arc welding joint according to any one of (1) to (3), the sheet thicknesses of the first metal sheet and the second metal sheet may be within a range of 1.6 mm to 3.4 mm.

(5) According to another aspect of the present invention, in the lap fillet arc welding joint according to any one of (1) to (4), the first metal sheet and the second metal sheet may be a zinc-coated steel sheet.

Effects of the Invention

According to the present invention, it is possible to provide a lap fillet arc welding joint in which stress concentrations in a weld toe portion and a root portion are reduced even in a state where a gap is present between metal sheets.

BRIEF DESCRIPTION OF THE DRAWINGS

FIG. 1(a) shows the shape before a tensile load is applied (a shape in an initial stage), FIG. 1(b) shows the shape after a tensile load is applied (a shape after being deformed due to a tensile load), and FIG. 1(c) shows the distribution of stress in each portion after a tensile load is applied.

FIG. 2(a) shows the shape before a tensile load is applied (a shape in an initial stage), FIG. 2(b) shows the shape after a tensile load is applied (a shape after being deformed due to a tensile load), and FIG. 2(c) shows the distribution of stress in each portion after a tensile load is applied.

FIG. 3(a) shows the shape before a tensile load is applied (a shape in an initial stage), FIG. 3(b) shows the shape after a tensile load is applied (a shape after being deformed due to a tensile load), and FIG. 3(c) shows the distribution of stress in each portion after a tensile load is applied.

FIG. 4(a) is a perspective view showing an example of a configuration of the member, and FIG. 4(b) is a view showing an example in a case of being seen in a plan view from an upper surface of the member shown in FIG. 4(a).

FIG. 8(a) shows a distribution under conditions of a bent angle α=45° and a position x of the lap steel sheet=1.2 mm, and FIG. 8(b) shows a distribution under conditions of the bent angle α=30° and the position x of the lap steel sheet=1.8 mm.

FIG. 10(a) is a cross-sectional view of a lap fillet arc welding joint having a large gap between the root portions, in a cross section perpendicular to the weld line, FIG. 10(b) is a cross-sectional view of a lap fillet arc welding joint having a large joint portion length, in a cross section perpendicular to the weld line.

FIGS. 13(a) and 13(b) are cross-sectional views of lap fillet arc welding joints welded by performing two-pass welding, in a cross section perpendicular to the weld line.

EMBODIMENT OF THE INVENTION (Knowledge which Inventors have Acquired)

First, the knowledge which the inventors have acquired will be described. The inventors detailedly examined a lap fillet arc welding joint which was manufactured with two steel sheets having a bent region on one end side of one steel sheet such that one steel sheet thereof was used as a lower sheet and the other steel sheet was used as an upper sheet, and in which two steel sheets thereof were subjected to lap fillet arc welding.

In the following description, as necessary, "a steel sheet (a lower sheet) in which a region on one end side is bent" will be referred to as "a bent steel sheet", and as necessary, "the other steel sheet (an upper sheet)" will be referred to as "a lap steel sheet".

In addition, in the following description, unless otherwise noted, in a case of being simply referred to as "the lap fillet arc welding joint" or "the lap fillet arc welding joint using a bent steel sheet", it indicates "a lap fillet arc welding joint which is manufactured with two steel sheets having a bent region of one end of one steel sheet such that one steel sheet thereof is used as a lower sheet and the other steel sheet is used as an upper sheet, and in which two steel sheets thereof are subjected to lap fillet arc welding", and a lap fillet arc welding joint in the related art in which a bent steel sheet is not adopted will be referred to as "a general lap fillet arc welding joint".

First, the inventors estimated the stress concentration factor regarding a tensile load of a lap fillet arc welding joint manufactured with a steel sheet having a sheet thickness of 2 mm through finite element method (FEM) analysis. FIGS. 1(a) to 3(c) are views showing examples of the results thereof.

Figure 1:
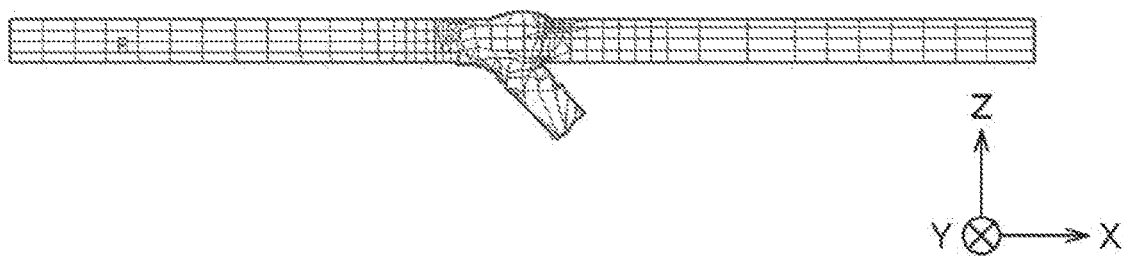
FIGS. 1(a) to 1(c) are views showing an example of an analysis result of stress in a case where deviation in a sheet thickness direction is not present between a central axis of a bent steel sheet in a sheet thickness and a central axis of a lap steel sheet in the sheet thickness.
Figure 1:
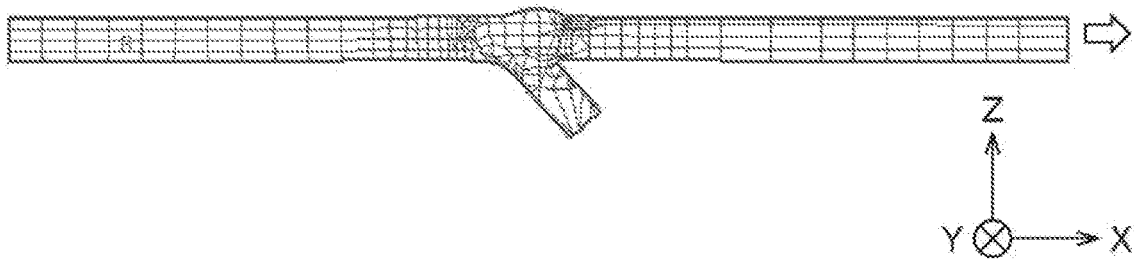
Figure 1:
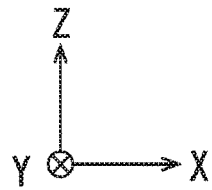
Figure 2:
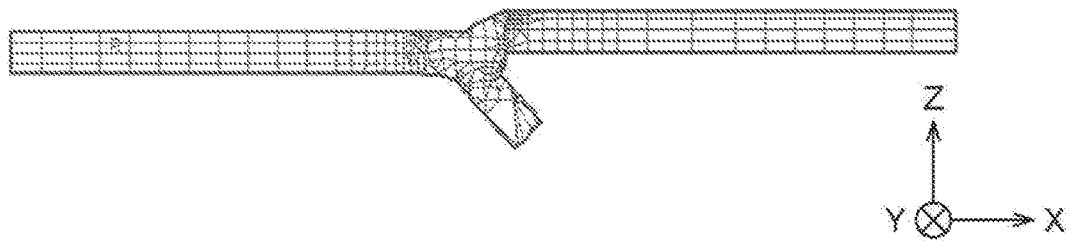
FIGS. 2(a) to 2(c) are views showing an example of an analysis result of stress in a case where the central axis of the lap steel sheet in the sheet thickness deviates to a weld toe portion side as much as ½ of the average value of the sheet thicknesses of the bent steel sheet and the lap steel sheet with respect to the central axis of the bent steel sheet in the sheet thickness.
Figure 2:
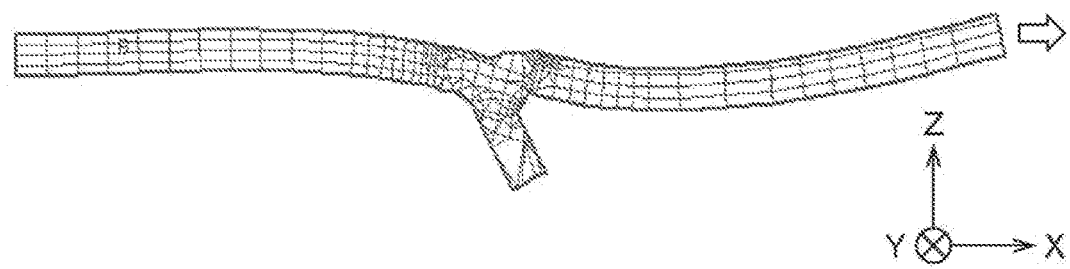
Figure 2:
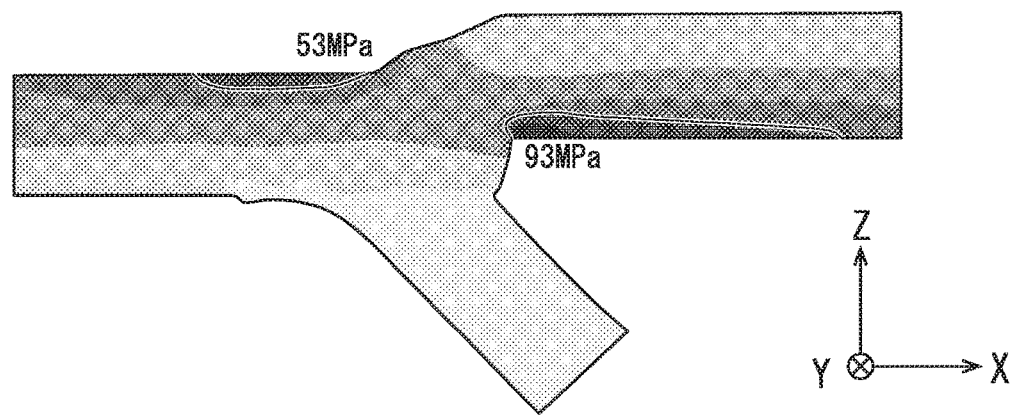
Figure 3:
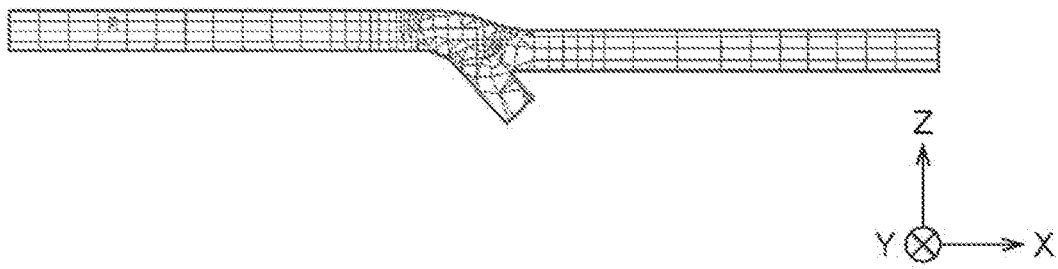
FIGS. 3(a) to 3(c) are views showing an example of an analysis result in a case where the central axis of the lap steel sheet in the sheet thickness deviates to a root portion side as much as ½ of the average value of the sheet thicknesses of the bent steel sheet and the lap steel sheet with respect to the central axis of the bent steel sheet in the sheet thickness.
Figure 3:
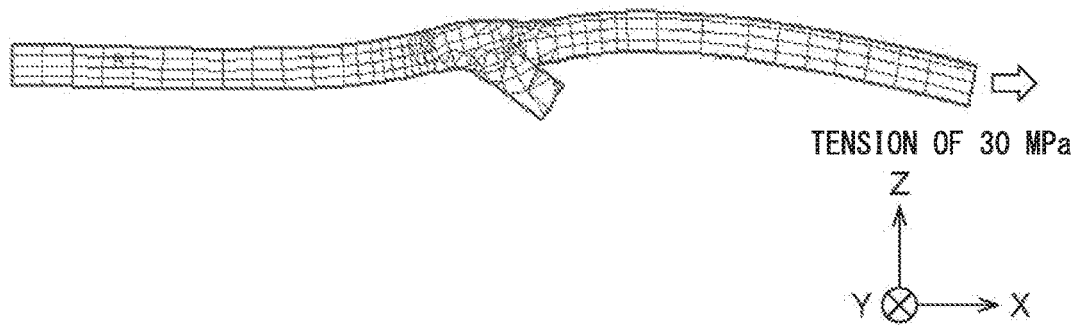
Figure 3:
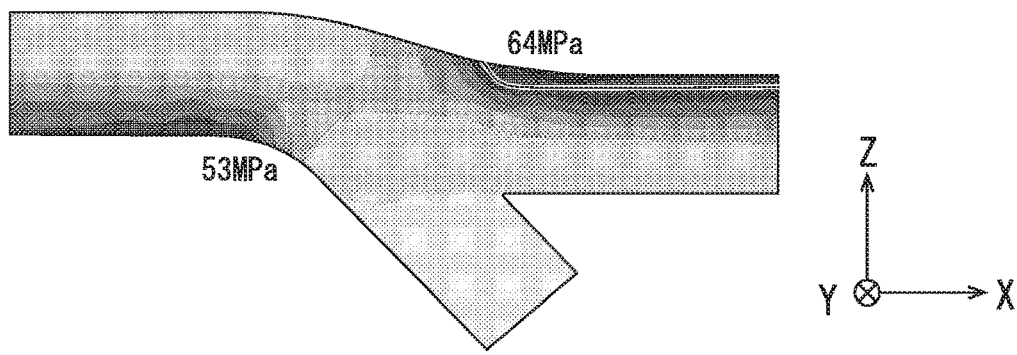

In FIGS. 1(a) to 3(c), FIGS. 1(a), 2(a), and 3(a) show shapes before a tensile load is applied (shapes in an initial stage). FIGS. 1(b), 2(b), and 3(b) show shapes after a tensile load is applied (shapes after being deformed due to a tensile load). FIGS. 1(c), 2(c), and 3(c) show a distribution of stress in each portion after a tensile load is applied.

Here, the FEM analysis was performed regarding a case where a tensile load of 30 MPa was applied to both end portions of the lap fillet arc welding joint (an end portion on the bent steel sheet side and an end portion on the lap steel sheet side).

FIGS. 1(a) to 1(c) are views showing an example of an analysis result of stress in a case where a bent angle α is 45°, and deviation in a sheet thickness direction (Z-axis direction) is not present between a central axis of the bent steel sheet in the sheet thickness and a central axis of the lap steel sheet in the sheet thickness.

Figure 5:
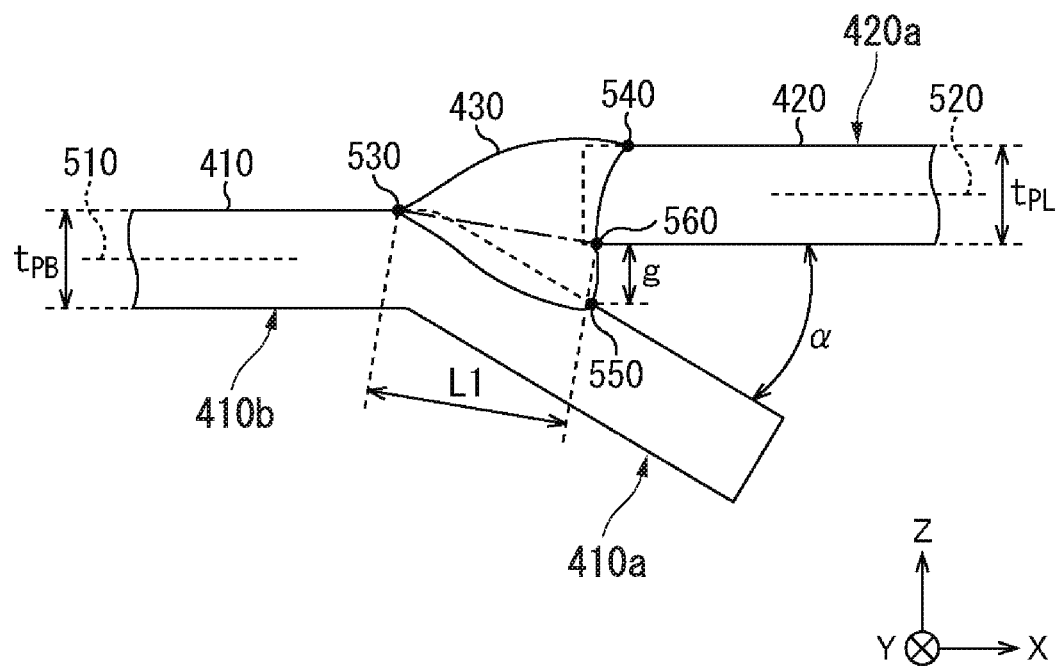
FIG. 5 is a schematic view for showing an example of a lap fillet arc welding joint and is a cross-sectional view in a cross section perpendicular to a weld line.

Here, the bent angle α is an angle (on the acute angle side) formed by a sheet surface of a bent region of the bent steel sheet and a sheet surface of the lap steel sheet (refer to FIG. 5).

In the present embodiment, the central axis in the sheet thickness is an axis passing through the center of the steel sheet in the sheet thickness direction and extending in a direction (X-axis direction) perpendicular to a direction (Y-axis direction, which will also be referred to as a longitudinal direction) along a weld line of a weld bead and the sheet thickness direction of the steel sheet (Z-axis direction). In addition, the central axis of the bent steel sheet in the sheet thickness indicates the central axis in the sheet thickness, of a region connected to the bent region of the bent steel sheet (a region substantially parallel to the lap steel sheet).

As shown in FIG. 1(c), stress (equivalent stress) in the bent steel sheet was maximized in a weld toe portion thereof, and its value was 32 MPa. On the other hand, stress (equivalent stress) in the lap steel sheet was maximized in a root portion thereof, and its value was 41 MPa. In this manner, in a case where a deviation is not present between the central axis of the bent steel sheet in the sheet thickness and the central axis of the lap steel sheet in the sheet thickness in the sheet thickness direction (Z-axis direction), the stress in the root portion of the lap steel sheet became 41 MPa. Although, it slightly increased, the stress concentration factor of the root portion of the lap steel sheet (the absolute maximum value thereof) was 1.36, which was insignificant.

Therefore, in the lap fillet arc welding joint as shown in FIGS. 1(a) to 1(c), it is possible to expect remarkable improvement in fatigue strength compared to a general lap fillet arc welding joint (a welding joint manufactured by performing lap fillet arc welding while causing sheet surfaces to face each other without bending a region on one end side).

FIGS. 2(a) to 2(c) are views showing an example of an analysis result of stress in a case where the bent angle α is 45°, and the central axis of the lap steel sheet in the sheet thickness deviates to the weld toe portion side as much as ½ of the average value of the sheet thicknesses of the bent steel sheet and the lap steel sheet with respect to the central axis of the bent steel sheet in the sheet thickness. Both the sheet thicknesses of the bent steel sheet and the lap steel sheet are 2 mm. Therefore, ½ of the average value of the sheet thicknesses of the bent steel sheet and the lap steel sheet is 1 mm.

As shown in FIG. 2(c), stress (equivalent stress) in the bent steel sheet was maximized in the weld toe portion thereof, and its value was 53 MPa. On the other hand, stress (equivalent stress) in the lap steel sheet was maximized in the root portion thereof, and its value was 93 MPa.

In a case where the central axis of the lap steel sheet in the sheet thickness deviates to the weld toe portion side with respect to the central axis of the bent steel sheet in the sheet thickness, when a tensile load is applied to both end portions of the lap fillet arc welding joint, as shown in FIG. 2(b), the bent steel sheet is deformed into a projected shape toward the weld toe portion side, and the lap steel sheet is deformed into a projected shape toward the root portion side. As a result, stress increases in the weld toe portion of the bent steel sheet and the root portion of the lap steel sheet. The stress concentration factor of the weld toe portion of the bent steel sheet was 1.8 (the absolute maximum value thereof), and the stress concentration factor of the root portion of the lap steel sheet was 3.1 (the absolute maximum value thereof).

In this manner, in a case where the central axis of the lap steel sheet in the sheet thickness deviates to the weld toe portion side with respect to the central axis of the bent steel sheet in the sheet thickness, the root portion of the lap steel sheet exhibits a higher stress concentration than the weld toe portion of the bent steel sheet. The stress concentration factor of a general lap fillet arc welding joint is approximately 4. Therefore, it is ascertained that the root portion of the lap steel sheet exhibits a stress concentration factor close thereto.

FIGS. 3(a) to 3(c) are views showing an example of an analysis result of stress in a case where the bent angle α is 45°, and the central axis of the lap steel sheet in the sheet thickness deviates to the root portion side as much as ½ of the average value of the sheet thicknesses of the bent steel sheet and the lap steel sheet with respect to the central axis of the bent steel sheet in the sheet thickness.

As shown in FIG. 3(c), stress (equivalent stress) in the bent steel sheet was maximized in the sheet surface thereof on the root portion side, and its value was 53 MPa. On the other hand, stress (equivalent stress) in the lap steel sheet was maximized in the weld toe portion thereof, and its value was 64 MPa.

In a case where the central axis of the lap steel sheet in the sheet thickness deviates to the root portion side with respect to the central axis of the bent steel sheet in the sheet thickness, when a tensile load is applied to both end portions of the lap fillet arc welding joint, as shown in FIG. 3(b), the bent steel sheet is deformed into a projected shape toward the root portion side, and the lap steel sheet is deformed into a projected shape toward the weld toe portion side. That is, the steel sheet is deformed in a direction opposite to that in the shape shown in FIG. 2(b). It is ascertained that the stress concentration in the root portion of the lap steel sheet is thereby eliminated.

In addition, the stress concentration factor of the sheet surface of the root portion on the bent steel sheet side was 1.8 (the absolute maximum value thereof), and the stress concentration factor of the weld toe portion of the lap steel sheet was 2.1 (the absolute maximum value thereof). In this manner, it is ascertained that the stress concentration factor is further reduced in a case where the central axis of the lap steel sheet in the sheet thickness deviates to the root portion side with respect to the central axis of the bent steel sheet in the sheet thickness than in a case where it deviates to the weld toe portion side.

According to those described above, it is ascertained that it is important for the fatigue strength of the lap fillet arc welding joint to reduce the stress concentration factor of the root portion of the lap steel sheet in a case where the central axis of the lap steel sheet in the sheet thickness has deviated to the weld toe portion side with respect to the central axis of the bent steel sheet in the sheet thickness (that is, in the cases of FIGS. 2(a) to 2(c)).

In FIGS. 2(c) and 3(c), a boundary of a region having high stress (50 MPa or higher) is indicated with a solid line. In FIG. 1(c), a region exhibiting high stress (50 MPa or higher) is not present. However, in FIGS. 2(c) and 3(c), a region having high stress (50 MPa or higher) is present, and it is ascertained that stress increases in the vicinity of the weld toe portion or the root portion.

It is ascertained that when a lap fillet arc welding joint is manufactured, in a case where positions of the central axes of two steel sheets in the sheet thickness deviate from each other in the sheet thickness direction, the stress concentration factor of the root portion of the upper sheet is maximized. From this fact, the inventors have conceived that there is a need to reduce the stress concentration factor of the root portion of the lap steel sheet. Therefore, the inventors have focused on that the length of a weld in a direction perpendicular to a direction along the weld line of the weld bead and the sheet thickness direction of the lap steel sheet is greater in a case where the central axis of the lap steel sheet in the sheet thickness deviates to the root portion side with respect to the central axis of the bent steel sheet in the sheet thickness than a case where it deviates to the weld toe portion side.

Then, the inventors have acquired an idea that it is effective to elongate the length of the weld in a direction perpendicular to the direction along the weld line of the weld bead and the sheet thickness direction of the lap steel sheet in order to reduce the stress concentration factor of the root portion of the lap steel sheet.

According to this idea, the inventors have found that it is effective when a joint portion length is elongated. Here, the joint portion length is the length of a straight line connecting a weld toe portion 530 and a root portion 560 to each other an X-Z cross section as indicated with L1 in FIG. 5.

As described above, it is assumed that when the joint portion length L1 is elongated, a load between the lap steel sheet and the bent steel sheet is smoothly transmitted, so that the stress concentration factor of the root portion of the lap steel sheet can be reduced. In order to elongate the joint portion length L1, there is a need to elongate the distance between the bent steel sheet and the lap steel sheet side.

If the bent steel sheet is significantly bent, a gap between the root portion of the bent steel sheet and the root portion of the lap steel sheet is excessively widened. In such a case, a melted metal flows out through this gap at the time of fillet arc welding, and there are cases where an appropriate weld bead will not be formed in one-pass welding. Therefore, it was found that it is preferable to limit the bent angle α after the joint portion length L1 is increased, in order to retain a favorable bead shape.

As described above, the inventors have found that when the distance between the root portion of the lap steel sheet and the weld toe portion of the bent steel sheet, that is, the joint portion length L1 is elongated, even in a case where the central axis of the lap steel sheet in the sheet thickness has deviated to a side where the weld toe portion is formed (upper sheet side) with respect to the central axis of the bent steel sheet in the sheet thickness, the stress concentration factor of the root portion of the lap steel sheet can be reduced. In addition, the inventors have found that when the bent angle α and the gap between the bent steel sheet and the root portion of the lap steel sheet are limited, the joint portion length L1 can be increased and poor welding work at the time of one-pass welding can be prevented. The embodiment described below has been provided according to the knowledge described above.

Hereinafter, with reference to the drawings, an embodiment of the present invention will be described. It is obvious that the present invention is not limited to the following embodiment.

Figure 4:
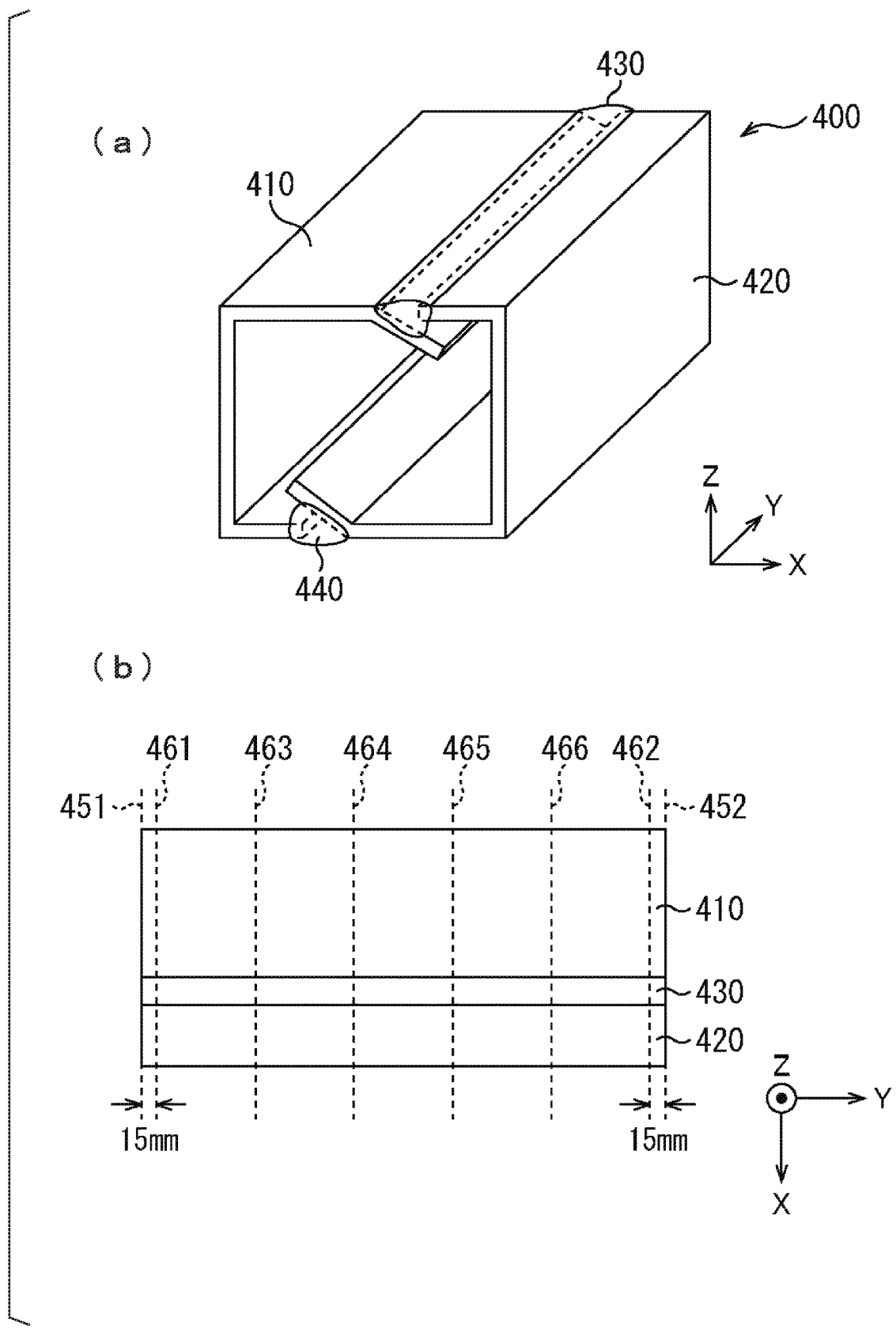
FIGS. 4(a) and 4(b) are schematic views showing an example of a member manufactured by performing lap fillet arc welding.

In the present embodiment, a case where a metal sheet is a steel sheet will be described as an example. However, the metal sheet does not have to be a steel sheet. FIGS. 4(a) and 4(b) are views showing an example of a member manufactured by performing lap fillet arc welding by a method of the present embodiment described below.

For example, the member shown in FIGS. 4(a) and 4(b) is a frame member of a suspension portion of an automobile but is not limited to a frame member of a suspension portion of an automobile. FIG. 4(a) is a perspective view showing an example of a configuration of a member 400. FIG. 4(b) is a view showing an example of an upper surface of the member 400 (a surface on which a weld bead 430 is formed) shown in FIG. 4(a).

In FIG. 4(a), the member 400 has a configuration in which steel sheets 410 and 420 are joined to each other by the weld beads 430 and 440 formed by performing lap fillet arc welding. In this manner, the weld beads 430 and 440 become joint portions of the steel sheets 410 and 420.

As shown in FIG. 4(a), the shapes of the steel sheet 410 and the steel sheet 420 in a cross section (X-Z cross section) perpendicular to a sheet width direction (Y-axis direction) are U shapes. That is, as shown in FIG. 4(a), in the X-Z cross section, the cross-sectional shapes of the steel sheet 410 and the steel sheet 420 have a region parallel to a Z axis, and a region connected to this region and parallel to an X axis. In the steel sheet 410 or the steel sheet 420, one end portion of the steel sheet further protrudes than the other end portion, and a tip end part of the protruding end portion has a shape bent to the inner side of the member 400.

Such shapes of the steel sheets 410 and 420 can be formed by performing pressing instead of bending. A member which becomes a target to be subjected to lap fillet arc welding by the method of the present embodiment described below is not limited to the member 400 shown in FIGS. 4(a) and 4(b).

In addition, a member manufactured by performing bending may be subjected to lap fillet arc welding by the method of the present embodiment described below.

FIG. 5 is a view showing an example of the lap fillet arc welding joint according to the present embodiment. FIG. 5 shows the X-Z cross section (a plane including the X axis and the Z axis) of a region in which the weld bead 430 shown in FIGS. 4(a) and 4(b) is formed, and a region in the vicinity thereof. Here, the X-Z cross section is a cross section perpendicular to a Y axis.

The lap fillet arc welding joint on a side where the weld bead 440 shown in FIGS. 4(a) and 4(b) is formed and the lap fillet arc welding joint shown in FIG. 5 have a rotationally symmetric relationship having the sheet width direction (Y-axis direction) of the steel sheets 410 and 420 as the rotary axis. Therefore, here, the lap fillet arc welding joint on a side where the weld bead 430 is formed will be described in detail, and detailed description of the lap fillet arc welding joint on a side where the weld bead 440 is formed will be omitted.

In the example shown in FIG. 5, the steel sheet 410 is a bent steel sheet, and the steel sheet 420 is a lap steel sheet. In the following description, as necessary, the steel sheet 410 will be referred to as the bent steel sheet 410, and the steel sheet 420 will be referred to as the lap steel sheet 420. In FIGS. 4(a) and 4(b), in the lap fillet arc welding joint on a side where the weld bead 440 is formed, the steel sheet 420 becomes the bent steel sheet, and the steel sheet 410 becomes the lap steel sheet.

<Shapes and Basic Dispositions of Bent Steel Sheet and Lap Steel Sheet on One End Side>

As shown in FIGS. 4(a), 4(b), and 5, a region of the bent steel sheet 410 on one end side (a region at an end on the positive direction side of the X axis) is bent. On the other hand, a region of the lap steel sheet 420 on one end side (on the negative direction side of the X axis) is not bent.

In addition, it is preferable that a region connected to the bent region of the bent steel sheet 410 (a region 410b of the bent steel sheet 410 in FIG. 5) and a region of the lap steel sheet 420 on one end side (a region 420a of the lap steel sheet 420 in FIG. 5) are substantially parallel to each other.

In FIG. 5, the bent region of the bent steel sheet 410 on one end side is referred to as a region 410a, and the region of the lap steel sheet 420 on one end side is referred to as the region 420a. In addition, a region connected to the bent region 410a of the bent steel sheet 410 is referred to as the region 410b.

The position of the tip end (the end on the positive direction side of the X axis) of the region 410a of the bent steel sheet 410 in the X-axis direction overlaps any position of the region 420a of the lap steel sheet 420 in the X-axis direction. In other words, in the X-axis direction, the position of the tip end of the region 410a of the bent steel sheet 410 overlaps the region 420a of the lap steel sheet 420.

In the region 420a of the lap steel sheet 420, the position of at least a part of the region of the lap steel sheet 420 in the Z-axis direction may overlap any position of the region 410a of the bent steel sheet 410 in the Z-axis direction.

In FIGS. 4(a), 4(b), and 5, a case where the position of a part of the region of the lap steel sheet 420 in the Z-axis direction overlaps any position of the region 410a of the bent steel sheet 410 in the Z-axis direction will be shown as an example.

The position of the entire region of the lap steel sheet 420 in the Z-axis direction may overlap any position of the bent region 410a of the bent steel sheet 410 in the Z-axis direction, in accordance with the sheet thicknesses of the bent steel sheet 410 and the lap steel sheet 420, the lengths of the region 410a of the bent steel sheet 410, the bent angle α, and the like.

In the following description, as necessary, "the region 410b of the bent steel sheet 410 (the region of the bent steel sheet 410 parallel to the X axis in FIG. 5)" will be referred to as "the non-inclined region 410b of the bent steel sheet 410". When one end side of the lap steel sheet 420 has a region substantially parallel to the region 410b of the bent steel sheet 410, that is, the region 420a, other regions may be bent. For example, other regions are parts of the lap steel sheet 420 parallel to the Z axis in FIGS. 4(a) and 4(b). In addition, the bent steel sheet 410 may be bent in other regions, in addition to the region on one end side. Other regions are parts of the bent steel sheet 410 parallel to the Z axis in FIGS. 4(a) and 4(b).

<Range of Deviation Between Central Axes in Sheet Thickness>

In FIG. 5, the amount of deviation between the central axis of the bent steel sheet 410 in the sheet thickness and the central axis of the region 420a of the lap steel sheet 420 in the sheet thickness is set to ½ times or less of the average value of a sheet thickness $t_{PB}$ of the bent steel sheet 410 and a sheet thickness $t_{PL}$ of the lap steel sheet 420, in any of a side where weld toe portions 530 and 540 are formed (the positive direction side of the Z axis) and a side where root portions 550 and 560 are formed (the negative direction side of the Z axis).

Here, the amount of deviation between the central axis of the bent steel sheet 410 in the sheet thickness and the central axis of the lap steel sheet 420 in the sheet thickness is the length in the Z-axis direction between a central axis 510 of the region 410b of the bent steel sheet 410 in the sheet thickness and a central axis 520 of the region 420a of the lap steel sheet 420 in the sheet thickness. As described above, the central axis in the sheet thickness indicates an axis passing through the center of the steel sheet in the sheet thickness direction and extending in a direction parallel to the outer surface of the steel sheet, in the X-Z cross section.

In FIG. 5, a case where the central axis 520 of the region 420a of the lap steel sheet 420 in the sheet thickness deviates to a side where the weld toe portions 530 and 540 are formed (the positive direction side of the Z axis) with respect to the central axis 510 of the region 410b of the bent steel sheet 410 in the sheet thickness will be shown as an example. If the range of deviation between the central axes 510 and 520 of the bent steel sheet 410 and the lap steel sheet 420 in the sheet thicknesses is the range described above, the central axis 520 of the region 420a of the lap steel sheet 420 in the sheet thickness may deviate to a side where the root portions 550 and 560 are formed (the negative direction side of the Z axis) with respect to the central axis 510 of the region 410b of the bent steel sheet 410 in the sheet thickness.

In the example of the lap fillet arc welding joint shown in FIG. 5, the negative direction of the Z axis is a direction in which the region 410a of the bent steel sheet 410 is bent. In other words, the negative direction of the Z axis is a direction in which the tip end of the region 410a of the bent steel sheet 410 is positioned with respect to the lap steel sheet 420.

In addition, in the bent steel sheet 410, the surface of the Z axis on the positive direction side may be referred to as an upper side surface, and the surface on the negative direction side of the Z axis may be referred to as a lower side surface. In the lap steel sheet 420, the surface of the Z axis on the positive direction side may be referred to as the upper side surface, and the surface on the negative direction side of the Z axis may be referred to as a lower side surface. That is, in the example of the lap fillet arc welding joint shown in FIG. 5, the weld toe portion 530 and the root portion 550 are positioned on the upper side surface of the bent steel sheet 410. In addition, the weld toe portion 540 is positioned on the upper side surface of the lap steel sheet 420, and the root portion 560 is positioned on the lower side surface of the lap steel sheet 420.

If the amount of deviation between the central axes of the bent steel sheet 410 and the lap steel sheet 420 in the sheet thickness exceeds ½ times the average value of the sheet thickness $t_{PB}$ of the bent steel sheet 410 and the sheet thickness $t_{PL}$ of the lap steel sheet 420, in a case where a load such as a tensile load is applied to the lap fillet arc welding joint, significant out-of-plane deformation occurs in the lap fillet arc welding joint. Therefore, in order to prevent such out-of-plane deformation from occurring, it is preferable that the amount of deviation between the central axes of the bent steel sheet 410 and the lap steel sheet 420 in the sheet thickness is set to ½ times or less of the average value of the sheet thickness $t_{PB}$ of the bent steel sheet 410 and the sheet thickness $t_{PL}$ of the lap steel sheet 420.

From the viewpoint of further reducing the amount of deviation between the central axes in the sheet thickness than that in a general lap fillet arc welding joint, a condition "smaller than ½ times" may be employed instead of "½ times or smaller".

<Range of Joint Portion Length>

Figure 6:
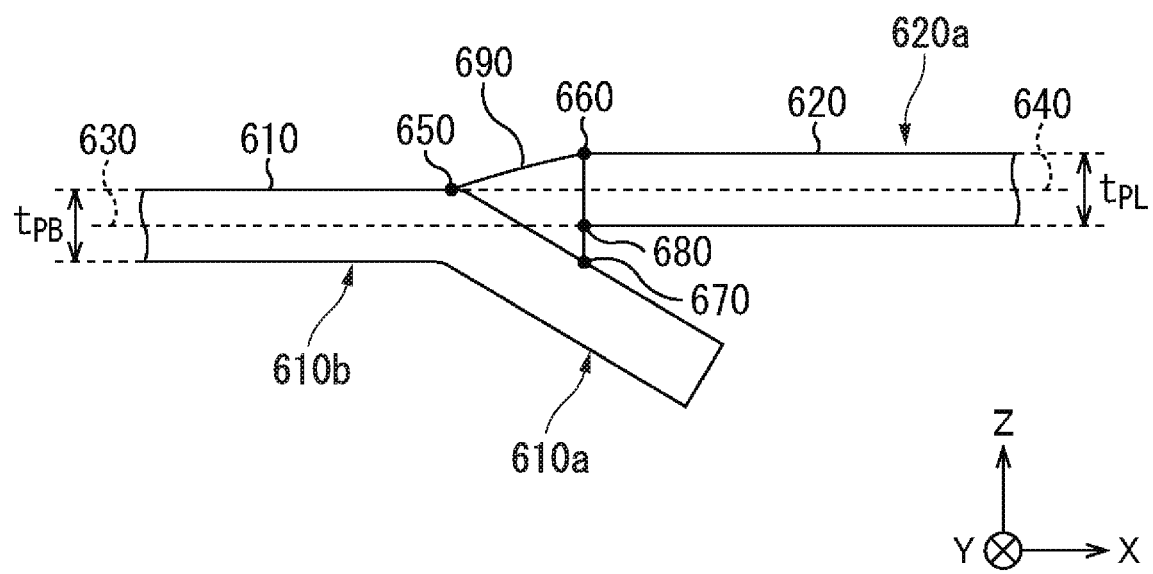
FIG. 6 is a schematic view for showing an example of a model of a lap fillet arc welding joint used when a joint portion length is examined and is a view postulating a cross section perpendicular to the weld line.

FIG. 6 is a view showing an example of a model of the lap fillet arc welding joint used when the joint portion length L1 is examined. Similar to FIG. 5, FIG. 6 also shows the X-Z cross section of a bent steel sheet 610 and a lap steel sheet 620.

Here, both the sheet thickness $t_{PB}$ of a bent steel sheet 610 and the sheet thickness $t_{PL}$ of a lap steel sheet 620 are equally set to 1.8 mm. In addition, the bent steel sheet 610 and the lap steel sheet 620 are disposed in a state where the positions of the bent steel sheet 610 and the lap steel sheet 620 are fixed, such that a central axis 640 of the lap steel sheet 620 in the sheet thickness is at a position which has deviated to a side where weld toe portions 650 and 660 are formed (the positive direction side of the Z axis) as much as ½ times the sheet thickness $t_{PB}$ of the bent steel sheet 610 with respect to a central axis 630 of the non-inclined region of the bent steel sheet 610 in the sheet thickness.

In addition, in FIG. 6, a bent region of the bent steel sheet 610 on one end side is referred to as a region 610a, and a region of the lap steel sheet 620 on one end side is referred to as a region 620a. In addition, a region connected to the bent region 610a of the bent steel sheet 610 is referred to as a region 610b.

In disposition as described above, the shape of a joint that can reduce the stress concentration factor of a root portion 680 of the lap steel sheet 620 in which stress is maximally concentrated is examined by performing analysis using the FEM while changing the bent angle α and the position of the lap steel sheet 620 in the X-axis direction (the direction perpendicular to the direction (the Y-axis direction) along the weld line of the weld bead 430 and the sheet thickness direction (the Z-axis direction) of the lap steel sheet 420).

Here, in order to simplify the analysis using the FEM, as shown in FIG. 6, the position of the weld toe portion 650 of the bent steel sheet 610 is set as a position of an origin (a curve point) of a bent portion of the bent steel sheet 610. In addition, the position of the weld toe portion 660 of the lap steel sheet 620 is set as the position of an upper end (the end on the positive direction side of the Z axis) which is one end (the tip end) of the lap steel sheet 620, and the position of the root portion 680 of the lap steel sheet 620 is set as the position of a lower end which is one end (the tip end) of the lap steel sheet 620. In addition, a root portion 670 of the bent steel sheet 610 is disposed on a sheet surface of the bent region of the bent steel sheet 610 and is disposed on a sheet surface on a side facing the lap steel sheet 620, and the position thereof in the X-axis direction is set to the same position as the position of one end (the tip end) of the lap steel sheet 620 in the X-axis direction.

Under the conditions described above, the bent angle α is changed to 45°, 30°, 20°, and 10°, and a position x (the unit is mm) of one end (the tip end) of the lap steel sheet 620 in the X-axis direction is changed. Then, in each of the states, the analysis using the FEM is performed, and stress of the root portion of the lap fillet arc welding joint (the bent steel sheet 610, the lap steel sheet 620, and a weld bead 690) is calculated.

Figure 7:
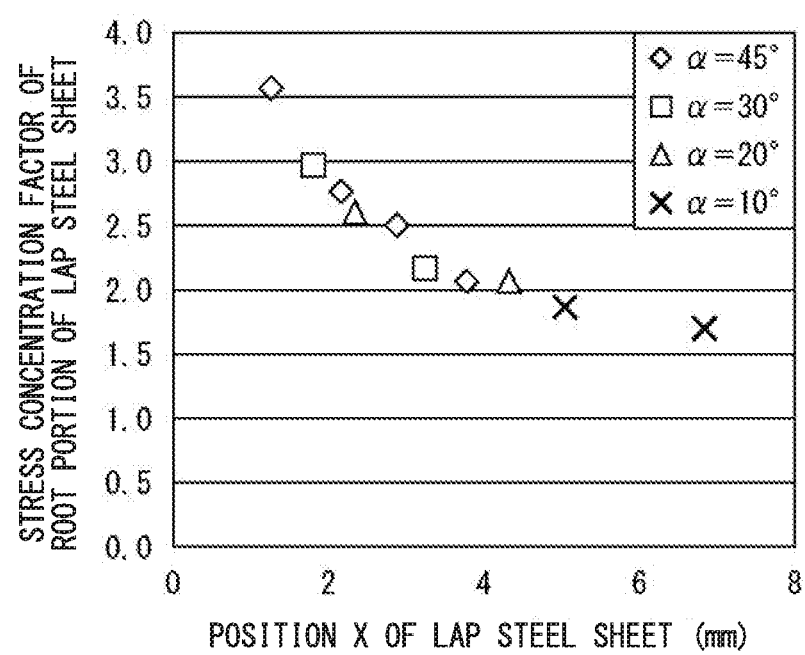
FIG. 7 is a graph showing an example of a relationship between a stress concentration factor of the root portion of the lap steel sheet and a position of the lap steel sheet.
Figure 8:
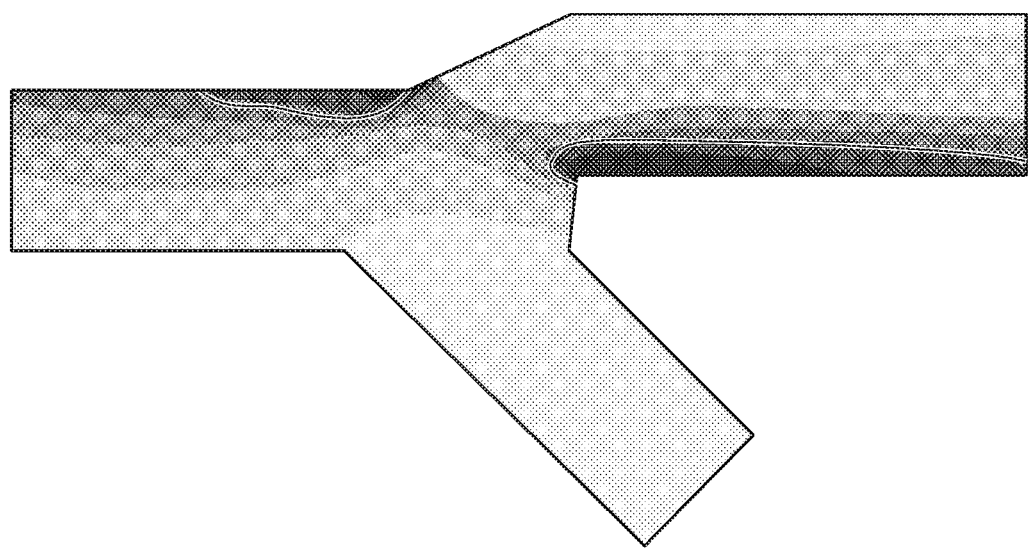
FIGS. 8(a) and 8(b) are schematic views showing examples of a distribution of stress in each portion of lap fillet arc welding joints.
Figure 8:
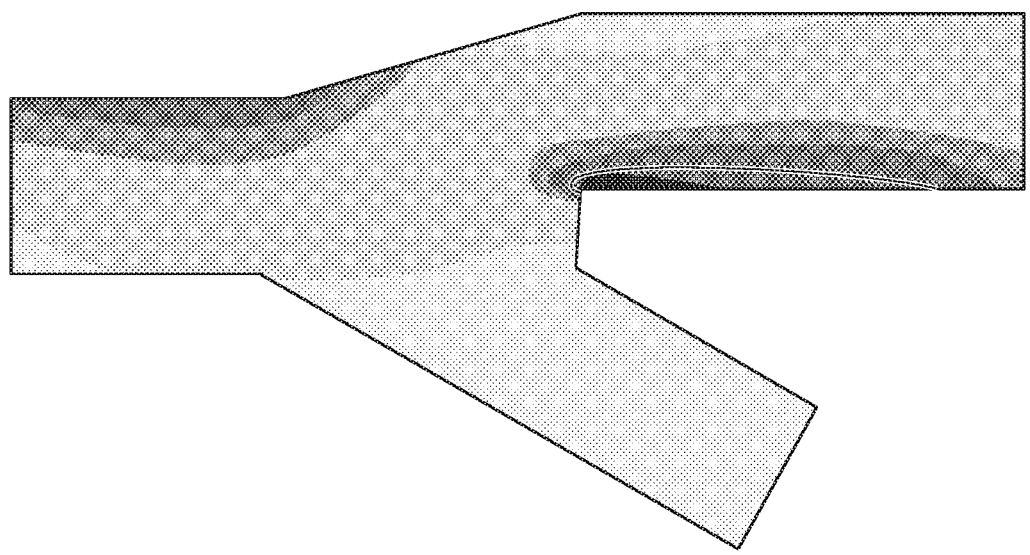
Figure 9:
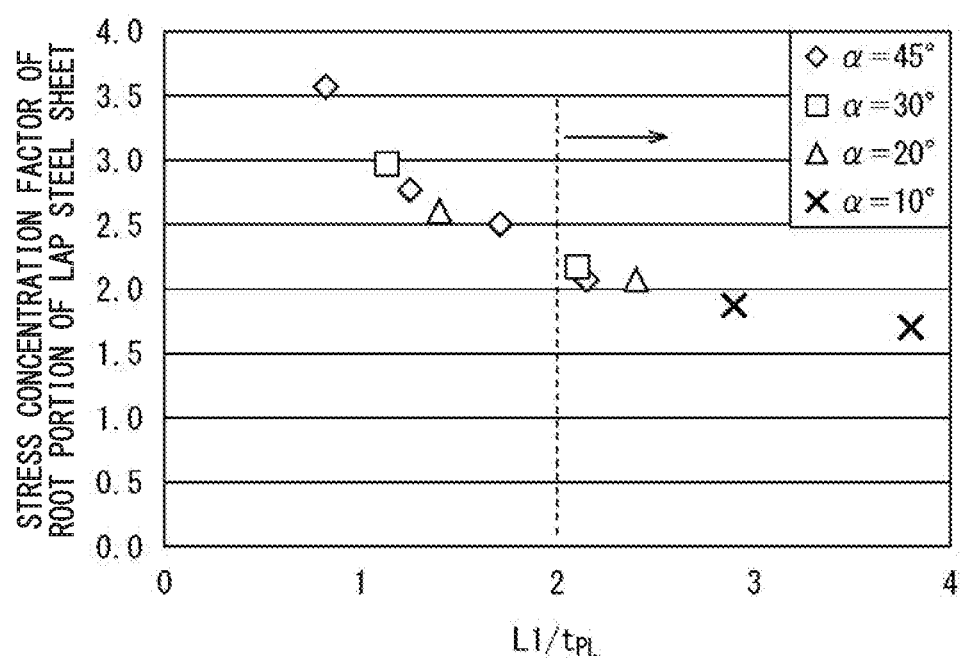
FIG. 9 is a graph showing an example of a relationship between the stress concentration factor of the root portion of the lap steel sheet and a value obtained by dividing the joint portion length by the sheet thickness of the lap steel sheet.

Here, regarding the value of the position x of one end (the tip end) of the lap steel sheet 620 in the X-axis direction, the position which becomes the origin of start of bending of the bent steel sheet 610 is set to 0 (zero, x=0) (as described above, in FIG. 6, the position which becomes the origin of start of bending of the bent steel sheet 610 is the same position as the position of the weld toe portion 650 of the bent steel sheet 610). Then, when the position of one end (the tip end) of the lap steel sheet 620 deviates in the positive direction of the X axis (when being away from the bent steel sheet 610), the value of the position of one end (the tip end) of the lap steel sheet 620 in the X-axis direction increases. In the following description, as necessary, "the position of one end (the tip end) of the lap steel sheet 620 in the X-axis direction" will be referred to as "the position x of the lap steel sheet". FIGS. 7 to 9 show graphs of the results of the analysis using the FEM described above.

FIG. 7 is a graph showing an example of a relationship between the stress concentration factor of the root portion 680 of the lap steel sheet 620 and the position x of the lap steel sheet. As shown in FIG. 7, it is ascertained that when the value of the position x of the lap steel sheet increases, the stress concentration factor of the root portion 680 of the lap steel sheet 620 is reduced at any bent angle α.

In addition, FIGS. 8(a) and 8(b) are views showing an example of a distribution of stress in each portion of the lap fillet arc welding joint. FIG. 8(a) shows a distribution under the condition of the bent angle α=45° and the position x of the lap steel sheet=1.2 mm, and FIG. 8(b) shows a distribution under the condition of the bent angle α=30° and the position x of the lap steel sheet=1.8 mm.

From the result described above, it is assumed that when the position x of the lap steel sheet increases (that is, the length of the joint portion in the X-axis direction is significant), a load is smoothly transmitted between the bent steel sheet 610 and the lap steel sheet 620.

FIG. 9 shows the result in which the stress concentration factor of the root portion 680 of the lap steel sheet 620 is rearranged while having the length (the joint portion length L1) from the root portion 680 of the lap steel sheet 620 to the weld toe portion 650 of the bent steel sheet 610 as an index of the length of the joint portion in the X-axis direction. FIG. 9 is a view showing an example of a relationship between the stress concentration factor of the root portion 680 of the lap steel sheet 620 and the value obtained by dividing the joint portion length L1 by the sheet thickness $t_{PL}$ of the lap steel sheet 620.

As shown in FIG. 9, it is ascertained that the stress concentration factor of the root portion 680 of the lap steel sheet 620 can be arranged by the joint portion length L1, regardless of the bent angle α and the position x of the lap steel sheet. In addition, it is ascertained that when the joint portion length L1 becomes smaller than twice the sheet thickness $t_{PL}$ of the lap steel sheet 620, the stress concentration factor of the root portion 680 of the lap steel sheet 620 rapidly increases.

From this fact, it is ascertained that when the joint portion length L1 is set to be two times or more of the sheet thickness $t_{PL}$ of the lap steel sheet 620 ($L1 \geq 2 \times t_{PL}$), the stress concentration factor of the root portion 680 of the lap steel sheet 620 can be suppressed to approximately 2, that is, approximately half of that in a general lap fillet arc welding joint. The inventors have confirmed that even if the kind of steel or the conditions of the sheet thickness are changed, such tendency is exhibited.

In addition, the upper limit value for the joint portion length L1 is not particularly limited. However, from the viewpoint of ensuring sufficient overlay in lap fillet arc welding, for example, it is preferable that the sheet thickness $t_{PL}$ of the lap steel sheet 620 is set to be five times or smaller ($L1 \leq 5 \times t_{PL}$).

According to those described above, in the present embodiment, the joint portion length L1 is set to be two times or more of the sheet thickness $t_{PL}$ of the lap steel sheet 420. Here, there are cases where the joint portion length L1 of the weld bead 430 varies depending on the place of the weld bead 430. In such a case, it is preferable to employ a representative value as the joint portion length L1 of the weld bead 430.

In the present embodiment, for example, as shown in FIG. 4(b), it is preferable that the average value of the joint portion lengths L1 in six places of positions 461 to 466 is set as the representative value of the joint portion length L1 of the weld bead 430. The position 461 is a position away from a welding start position 451 of the weld bead 430 in a proceeding direction of welding (a relative proceeding direction of a welding wire with respect to the place to be welded) as much as 15 mm. The position 462 is a position away from a welding end position 452 of the weld bead 430 in a direction opposite to the proceeding direction of welding as much as 15 mm. The positions 463 to 466 are positions dividing the range in the Y-axis direction (the direction along the weld line of the weld bead 430) into five sections while having the positions 461 and 462 as both ends.

Even in a case where the welding start position and the welding end position of the weld bead overlap each other, as described above, the average value of the joint portion lengths L1 in the X-Z cross section at positions of six places can be set as the representative value of the joint portion length L1 of the weld bead.

In addition, the representative value of the joint portion length L1 of the weld bead 430 is not necessarily limited to that described above. For example, a median value can be adopted instead of the average value. In addition, instead of dividing the range into five sections, calculation may be performed while dividing the range into n sections (n is an integer of two or greater).

<Position of Weld Toe Portion of Bent Steel Sheet>

In the present embodiment, the position of the weld toe portion 530 of the bent steel sheet 410 in the Z-axis direction (the sheet thickness direction of the lap steel sheet 420) is set to a range of a first position to a second position.

Here, the first position is a position on the sheet surface of the region 410b of the bent steel sheet 410 and is a position on the sheet surface on a side where the weld bead 430 is formed (on the sheet surface on the positive direction side of the Z axis). This first position is a position in the region where the weld bead 430 is not formed. The second position is the position of the central axis 510 of the region 410b of the bent steel sheet 410 in the sheet thickness in the Z-axis direction.

In the following description, as necessary, "the sheet surface of the region 410b of the bent steel sheet 410 and the sheet surface on a side where the weld bead 430 is formed (on the sheet surface on the positive direction side of the Z axis)" will be referred to as "the outer surface of the region 410b of the bent steel sheet 410".

If the weld toe portion 530 of the bent steel sheet 410 is on the outer surface of the region 410b of the bent steel sheet 410, the shape of the weld toe portion 530 can be smoothened, which is preferable. On the other hand, when the weld toe portion 530 of the bent steel sheet 410 is positioned in the bent region of the bent steel sheet 410, depressions are generated in the weld toe portion 530, and a stress concentration occurs at a part where the depressions are generated.

When the position of the weld toe portion 530 of the bent steel sheet 410 in the Z-axis direction is positioned to be closer to the tip end side (the negative direction side of the Z axis) of the region 410a of the bent steel sheet 410 than the position of the central axis 510 of the region 410b of the bent steel sheet 410 in the sheet thickness, there is concern that the shapes of these depressions become large and complicated so that a significant out-of-plane deformation occurs.

According to those described above, in the present embodiment, the position of the weld toe portion 530 of the bent steel sheet 410 in the Z-axis direction is in a range from the position (that is, the first position) on the outer surface of the region 410b of the bent steel sheet 410 to the position (that is, the second position) of the central axis 510 of the region 410b of the bent steel sheet 410 in the sheet thickness.

In the description above, it is stated that the stress concentration factor of the root portions 550 and 560 of the lap fillet joint can be reduced by regulating <Range of deviation between central axes in sheet thickness>, <Range of joint portion length>, and <Position of weld toe portion of bent steel sheet>.

If multi-pass welding is performed in a manner of welding of a thick steel sheet, welding work satisfying these conditions can be performed without providing any special restriction on the shape of a joint. However, for example, automobile members in which productivity is emphasized are often manufactured by performing one-pass welding. Therefore, stable welding having no flowing-out of a melted metal or a burn-through defect is required to be performed. Therefore, as described below, it is preferable to regulate <Gap between root portions>, <Upper limit for joint portion length>, and <Range of bent angle>.

<Gap Between Root Portions>

Figure 10:
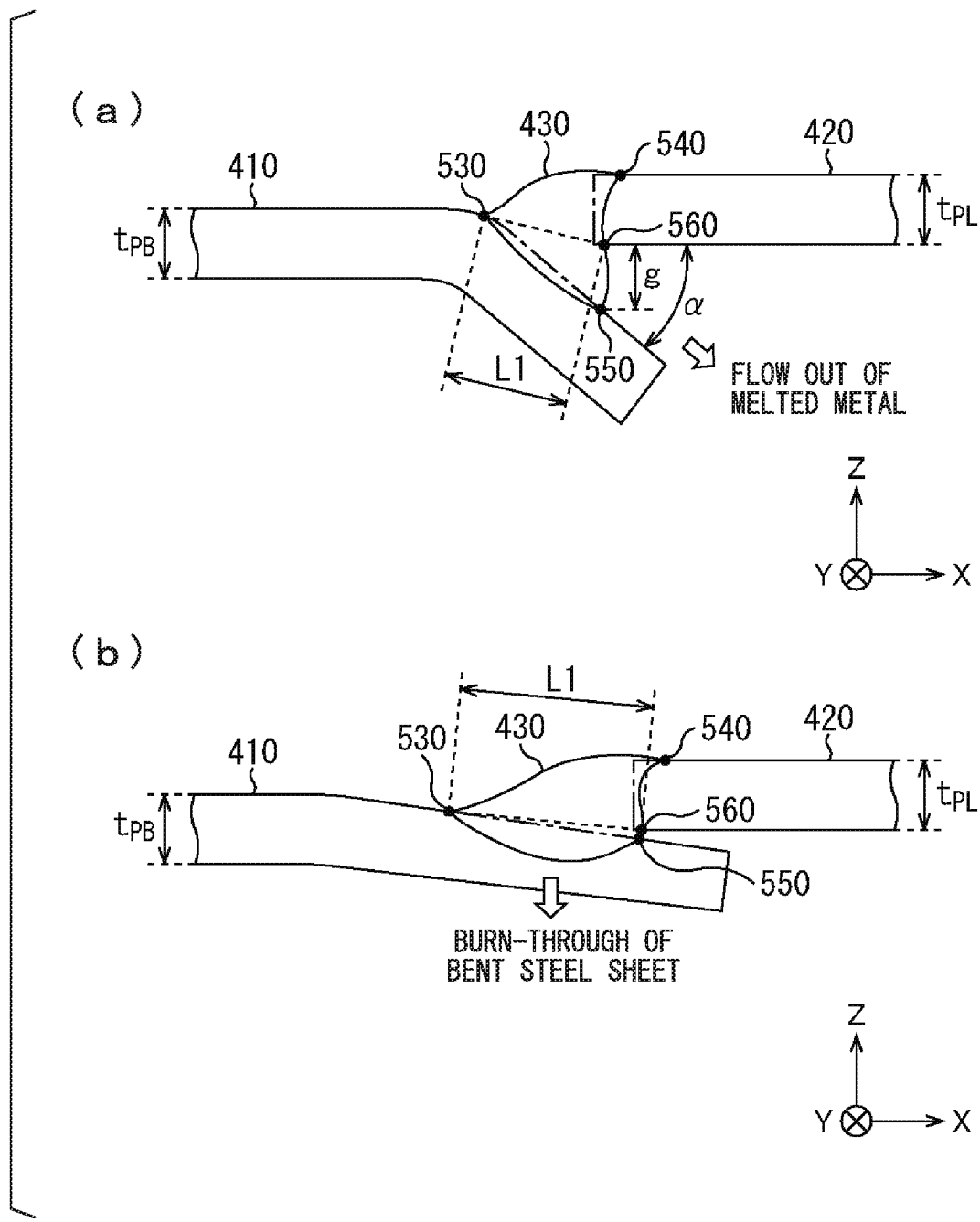
FIGS. 10(a) and 10(b) are schematic views showing comparative examples of lap fillet arc welding joints.

As shown in FIG. 5, the present embodiment has proposed a method which can reduce the stress concentration in the root portions 550 and 560 even if a welding joint is produced in a state where a gap is present between the bent steel sheet 410 and the lap steel sheet 420. However, when a gap g between the root portion 550 and the root portion 560 (the distance between the root portion 550 and the root portion 560 in the sheet thickness direction (the Z-axis direction) of the lap steel sheet 420) excessively increases, as shown in FIG. 10(a), a melted metal flows out through this gap g when welding work is performed (refer to the outlined arrow line in FIG. 10(a)), thereby resulting in poor welding work. Therefore, in order to perform favorable welding work by performing one-pass welding, there is a need to provide the upper limit for the gap g between the root portion 550 and the root portion 560.

According to the experience of the inventors, in a general lap fillet arc welding joint using no bent steel sheet, when a gap between the root portions becomes approximately 1.5 times or larger than the sheet thickness of the lap steel sheet, poor welding work is resulted. In the lap fillet arc welding joint using the bent steel sheet 410 according to the present embodiment, the region 410a of the bent steel sheet 410 is inclined with respect to the lap steel sheet 420. Therefore, even if the gap g between the root portion 550 and the root portion 560 is 1.5 times the sheet thickness of the lap steel sheet 420, a melted metal is likely to flow out through the gap g between the root portion 550 and the root portion 560.

Therefore, in order to realize stable welding work, it is preferable the upper limit for the gap g between the root portion 550 and the root portion 560 is set to the sheet thickness $t_{PL}$ of the lap steel sheet 420. That is, it is preferable that the relationship of ($g \leq t_{PL}$) is satisfied.

<Upper Limit for Joint Portion Length>

In the section of <Range of joint portion length> described above, it is stated that when the lower limit value for the joint portion length L1 is set to be twice the sheet thickness $t_{PL}$ of the lap steel sheet 420 (that is, $L1 > 2 \times t_{PL}$), the stress concentration factor of the root portions 550 and 560 can be reduced. As described in the section of <Range of joint portion length>, from the viewpoint of reducing the stress concentration factor of the root portions 550 and 560, the upper limit for the joint portion length L1 is not particularly limited. However, from the viewpoint of weldability for actually producing a welding joint with one pass, it is preferable to set the upper limit for the joint portion length L1.

As shown in FIG. 10(b), in order to increase the joint portion length L1, there is a need to increase a welding heat input and to widen the width (the length in the X-axis direction) of the weld bead 430. However, when a welding heat input is excessively increased, there are cases where burn-through is generated in the bent steel sheet 410 (refer to the outlined arrow line in FIG. 10(b)), or a pore defect is generated in the weld toe portion 540 on the lap steel sheet 420 side. It can be confirmed that when the joint portion length L1 is set to be four times or less of the sheet thickness $t_{PL}$ of the lap steel sheet 420 (that is, $L1 \leq 4t_{PL}$), poor welding work of these is not caused.

Therefore, it is preferable that the upper limit for the joint portion length L1 is set to be four times the sheet thickness $t_{PL}$ of the lap steel sheet 420. That is, it is preferable that the relationship of ($L1 \leq 4t_{PL}$) is satisfied. In the section of <Range of joint portion length>, the upper limit for the joint portion length L1 is set to be $5 \times t_{PL}$. However, this is a value on the premise of multi-pass welding. In a case on the premise of one-pass welding, it is preferable that the upper limit for the joint portion length L1 is $4 \times t_{PL}$.

<Range of Bent Angle>

Similar to the joint portion length L1 or the gap g between the root portions 550 and 560, the bent angle α of the bent steel sheet 410 also affects weldability. In a case where the bent angle α is large, as shown in FIG. 10(a), the gap g between the root portions 550 and 560 is likely to be wide. Therefore, poor welding work due to flowing-out of a melted metal is likely to be generated.

On the other hand, in a state where the bent angle α is small, if the amount of deviation between the central axes of the bent steel sheet 410 and the lap steel sheet 420 in the sheet thickness is intended to be set to ½ times or less of the average value of the sheet thickness $t_{PB}$ of the bent steel sheet 410 and the sheet thickness $t_{PL}$ of the lap steel sheet 420, as shown in FIG. 10(b), there is a need to perform welding having the significant joint portion length L1.

However, as described in the section of <Upper limit for joint portion length>, in order to obtain the weld bead 430 having the significant joint portion length L1, there is a need to increase the welding heat input and to widen the width of the weld bead 430, so that poor welding work is generated in accordance therewith. In addition, when the bent angle α is small in a case where welding is performed with one pass, the position of the weld toe portion 530 of the bent steel sheet 410 in the Z-axis direction is positioned on the tip end side (the negative direction side of the Z axis) of the bent region of the bent steel sheet 410, and the weld toe portion 530 of the bent steel sheet 410 is likely to be a stress concentration place.

In order to avoid these problems, it is preferable that the bent angle α is within a range of 10° to 35°.

Figure 11:
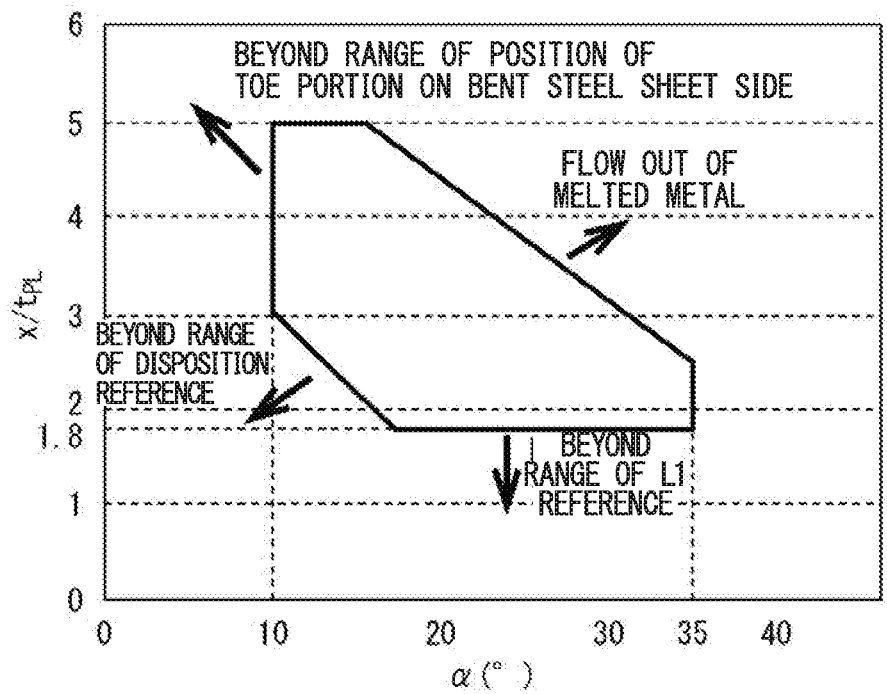
FIG. 11 is a schematic view for showing an example of a relationship between the position of the lap steel sheet and the bent angle.
Figure 12:
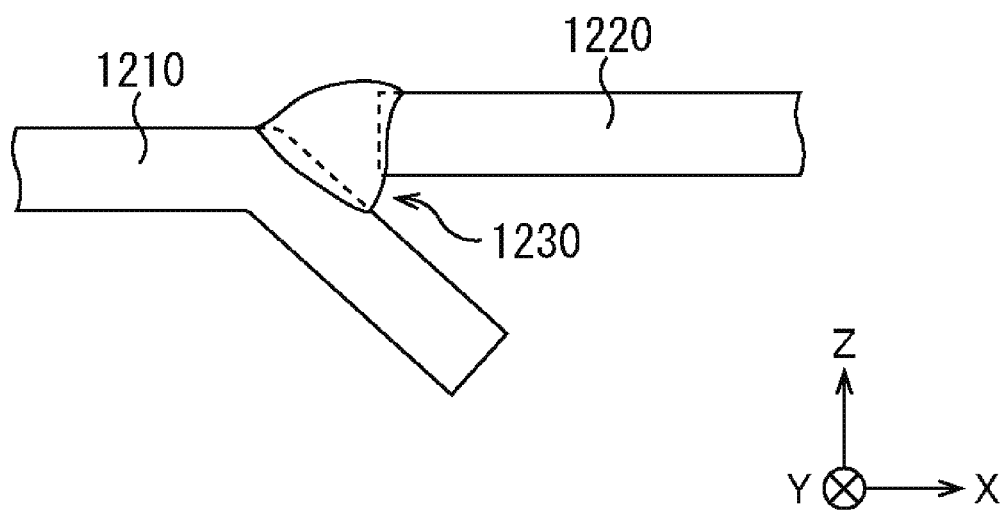
FIG. 12 is a schematic view showing that a gap is generated between steel sheets when a lap fillet arc welding joint is manufactured and is a cross-sectional view in a cross section perpendicular to the weld line.

In order to verify a proper range of the bent angle α for performing stable welding work with one-pass welding, the inventors have manufactured a plurality of lap fillet arc welding joints in which the bent angle α and the position x of the lap steel sheet is varied. As a welding method, a pulsed magnetron welding method generally adopted in a frame member of a suspension portion of an automobile is used. In addition, here, steel sheets having a sheet thickness of 3.2 mm are used. FIG. 11 shows the results thereof. FIG. 11 is a view showing an example of a relationship between the position x of the lap steel sheet (here, standardized at x mm/$t_{PL}$ mm (the sheet thickness of the lap steel sheet)) and the bent angle α.

As shown in FIG. 11, in a case where both the bent angle α and the position x of the lap steel sheet/$t_{PL}$ are large, the gap between the bent steel sheet 410 and the lap steel sheet 420 increases, and a melted metal flows out through the gap, thereby being resulted in poor welding work (refer to a part indicated as "flowing-out of a melted metal" in FIG. 11). A preferable range in which flowing-out of a melted metal is not caused is a range satisfying the condition of approximately "$x/t_{PL} \leq -0.125 \times \alpha + 6.875$".

In addition, in a case where the bent angle α is small (α<10) and the position x of the lap steel sheet/$t_{PL}$ is large ($x/t_{PL}$>5), if a welding condition of a high heat input is set such that the position of the weld toe portion 530 of the bent steel sheet 410 in the Z-axis direction becomes closer to the inner side (the positive direction side of the Z axis) of the bent region 410a of the bent steel sheet 410 than the position of the central axis 510 of the bent steel sheet 410 of the non-inclined region 410b in the sheet thickness, a pore defect has been generated in the bent steel sheet 410 (refer to a part indicated as "BEYOND RANGE OF POSITION OF TOE PORTION ON BENT STEEL SHEET SIDE" in FIG. 11).

Moreover, in a case where both the bent angle α and the position x of the lap steel sheet/$t_{PL}$ are small, the lap steel sheet 420 hits the bent steel sheet 410, so that it is not possible to satisfy the condition of the reference (the amount of deviation between the central axis of the region 410b of the bent steel sheet 410 in the sheet thickness and the central axis of the region 420a of the lap steel sheet 420 in the sheet thickness is set to be ½ times or less of the average value of the sheet thickness $t_{PB}$ of the bent steel sheet 410 and the sheet thickness $t_{PL}$ of the lap steel sheet 420) described above in the section of <Range of deviation between central axes in sheet thickness> (refer to a part indicated as "BEYOND RANGE OF DISPOSITION REFERENCE" in FIG. 11). A preferable range satisfying this condition a range satisfying the condition of approximately "$x/t_{PL} \geq -0.2 \times \alpha + 5$".

In addition, in a case where the position x of the lap steel sheet/$t_{PL}$ is 1.8 smaller than ($x/t_{PL}$<1.8), which is insignificant, regardless of the value of the bent angle α, the reference of the reference ($L1 \geq 2 \times t_{PL}$) described above in the section of <Range of joint portion length> cannot be satisfied (refer to a part indicated as "BEYOND RANGE OF L1 REFERENCE" in FIG. 11).

Even in a case where welding is performed with one pass, if a lap fillet welding joint is manufactured under the condition of becoming the value in the region on the inner side of the polygon shown in FIG. 11, the references described in the sections of <Range of joint portion length>, <Range of deviation between central axes in sheet thickness>, <Position of weld toe portion of bent steel sheet>, <Gap between root portions>, and <Upper limit for joint portion length> can be satisfied, and poor welding work due to the widened gap g between the root portions 550 and 560 is not caused, thereby being preferable.

According to those described above, when postulating to perform welding with one pass, it is preferable that the bent angle α is within a range of 10° to 35° (that is, 10°≤α≤35°), the upper limit for the joint portion length L1 is four times the sheet thickness $t_{PL}$ of the lap steel sheet 420, and the upper limit for the gap g between the root portions 550 and 560 is set to the sheet thickness $t_{PL}$ of the lap steel sheet 420.

<Steel Sheet>

The object of the present embodiment is to reduce the stress concentration in the lap fillet arc welding joint. Therefore, the kind of the steel sheet is not particularly limited. For example, steel sheets having various tensile strength, including soft steel sheets having tensile strength of approximately 270 MPa to super high tension steel sheets having tensile strength of approximately 1,180 MPa can be used. However, from the viewpoint of weight reduction of the member, it is preferable to use high tension steel sheets (for example, steel sheet having tensile strength of 590 MPa or higher in a case of being measured by the method disclosed in JIS G 3101). In addition, a steel sheet of the same kind may be combined, or a steel sheet of a different kind may be combined.

In addition, there is no special restriction related to the sheet thickness of the steel sheet. However, from the viewpoint of preventing a member from being deformed due to bending moment in a case where a load is applied to the member, it is effective use a thin steel sheet in which the sheet thickness of one or both the bent steel sheet 410 and the lap steel sheet 420 is within a range of 1.6 mm to 3.4 mm. In addition, a steel sheet having the same sheet thickness may be used, or a steel sheet having a different sheet thickness may be used.

In addition, from the viewpoint of corrosion resistance of a member, a zinc-coated steel sheet (a steel sheet of which the outer surface is coated with zinc) is used sometimes. However, in a general lap fillet arc welding joint, a blowhole is likely to be generated in the root portion due to zinc vapor, and this sometimes becomes a problem. In the lap fillet arc welding joint according to the present embodiment, the root portions 550 and 560 are in any state of having a gap, and being in contact with each other through a line (being in contact through a plurality of points depending on the working state of one end surface (the tip end surface) of the lap steel sheet 420). Therefore, zinc vapor at the time of welding does not enter the inside of a melted metal and is likely to be discharged through the gap between the bent steel sheet 410 and the lap steel sheet 420 on the root portions 550 and 560 side. Therefore, a blowhole can be prevented.

Thus, when a zinc-coated steel sheet is used for one or both the bent steel sheet 410 and the lap steel sheet 420, corrosion resistance is achieved, thereby being effective. Zinc-coating need only include zinc in coating. For example, zinc-coated steel sheets include hot-dip galvanized steel sheets and galvannealed steel sheets. In addition, a steel sheet of which the outer surface is subjected to coating other than zinc-coating may be used for one or both the bent steel sheet 410 and the lap steel sheet 420.

<Manufacturing Method>

Next, an example of a method of manufacturing a lap fillet arc welding joint will be described.

First, two steel sheets having a flat surface shape are prepared. Next, in two steel sheets, a region of one steel sheet on one end side is bent. The bent angle α is decided by a designer according to the shape of the member or a load or the like postulated to be applied to the member. In a case of manufacturing the lap fillet arc welding joint with one pass, the bent angle α is set to be within a range of 10° to 35°. In a case of manufacturing the lap fillet arc welding joint with multi-pass, the bent angle α may be set to be within a range of 10° to 35°, or the bent angle α does not have to be set to be within the range thereof. However, from the viewpoint of workability and the like of working, it is preferable that the bent angle α is 10° or large. In this manner, the bent steel sheet 410 is manufactured. In two steel sheets, the other steel sheet becomes the lap steel sheet 420.

Next, positioning of the bent steel sheet 410 and the lap steel sheet 420 is performed. When this positioning is performed, the sheet surface of the region 410b of the bent steel sheet 410 and the sheet surface of the lap steel sheet 420 are set to be substantially parallel to each other.

In addition, the amount of deviation between the central axes of the bent steel sheet 410 and the lap steel sheet 420 in the sheet thickness in the sheet thickness direction (Z-axis direction) is set to ½ times or less of the average value of the sheet thickness $T_{PB}$ of the bent steel sheet 410 and the sheet thickness $T_{PL}$ of the lap steel sheet 420.

In addition, the region 410a of the bent steel sheet 410 (before welding) and one end of the lap steel sheet 420 (before welding) are set to face each other in a state of abutting each other or having a space therebetween, such that the position of the tip end of the bent region 410a of the bent steel sheet 410 in the X-axis direction overlaps any position of the region 420a of the lap steel sheet 420 in the X-axis direction, and the position of at least a part of the region of the lap steel sheet 420 in the Z-axis direction overlaps any position of the region 410a of the bent steel sheet 410 in the Z-axis direction in the region 420a of the lap steel sheet 420.

In addition, the distance between the region 410a of the bent steel sheet 410 (before welding) and one end of the lap steel sheet 420 (before welding) is set such that the weld length L1 becomes two times or more of the sheet thickness $t_{PL}$ of the lap steel sheet is. The weld length L1 is decided by a designer according to the shape of the member, a load postulated to be applied to the member, the shape and the size (the bent angle α, the length of the bent region, and the like) of the bent steel sheet 410 and the lap steel sheet 420, and the like.

The inventors have confirmed that even if the welding conditions such as the welding method and the thickness of the steel sheet are changed, when a lap fillet welding joint is manufactured on condition that the bent angle α and the position x of the lap steel sheet/tin, becomes the value of the region within the polygon shown in FIG. 11, the reference described above in the sections of <Range of joint portion length>, <Range of deviation between central axes in sheet thickness>, <Position of weld toe portion of bent steel sheet>, <Gap between root portions>, and <Upper limit for joint portion length> can be satisfied by performing one-pass welding.

In a case of performing welding with one pass, when positioning of the bent steel sheet 410 and the lap steel sheet 420 is performed, it is preferable that the conditions of "$1.8 \le x/t_{PL} \le 5$", "$x/t_{PL} \le -0.125 \times \alpha + 6.875$", and "$x/t_{PL} \ge -0.2 \times \alpha + 5$" are further satisfied.

On the other hand, in a case of performing multi-pass welding, when positioning of the bent steel sheet 410 and the lap steel sheet 420 is performed, the conditions of "$1.8 \le x/t_{PL} \le 5$", "$x/t_{PL} \le -0.125 \times \alpha + 6.875$", and "$x/t_{PL} \ge -0.2 \times \alpha - 5$" are not necessarily satisfied. However, even in a case of performing multi-pass welding, in the same manner as in the case of performing welding with one pass, positioning of the bent steel sheet 410 and the lap steel sheet 420 may be performed.

Positioning is performed as described above, and the bent steel sheet 410 and the lap steel sheet 420 are fixed to each other by using a jig or the like.

Next, a welding wire is supplied from the positive direction side of the Z axis (in the direction in which the lap steel sheet 420 is seen closer to the hand side than the tip end of the bent region 410a of the bent steel sheet 410) to regions facing each other, such as the bent region 410a of the bent steel sheet 410, and one end of the lap steel sheet 420, and lap fillet arc welding is performed along the Y-axis direction (the sheet width direction of the bent steel sheet 410 and the lap steel sheet 420).

The kind of the welding wire is not particularly limited. Over-matching or under-matching may be adopted. However, higher weld fatigue strength can be expected by adopting over-matching.

In addition, in the present embodiment, gas shield arc welding is performed. In this case, in the present embodiment, as shield gas, argon gas (Ar gas), or mixed gas including carbonic acid gas ($CO_2$ gas) or oxygen gas ($O_2$ gas) is used as an example of inert gas.

For example, the volume fraction of carbonic acid gas ($CO_2$ gas) with respect to shield gas can be set to be within a range of 3 volume % to 20 volume %. In addition, for example, the volume fraction of oxygen gas ($O_2$ gas) with respect to shield gas can be set to be within a range of 1 volume % to 4 volume %.

As described above, it is preferable that the weld toe portion 530 of the bent steel sheet 410 is positioned on the outer surface of the non-inclined region of the bent steel sheet 410. Therefore, it is preferable to widen the width of the weld bead formed by welding performed once. From the viewpoint thereof, it is preferable that the amounts of carbonic acid gas ($CO_2$ gas) and oxygen gas ($O_2$ gas) are reduced such that plasma generated due to arc discharges easily spreads and the width of the weld bead formed by welding performed once can be widened. Therefore, for example, it is preferable that the volume fraction of carbonic acid gas ($CO_2$ gas) with respect to shield gas is set to be within a range of 3 volume % to 10 volume %. In addition, for example, it is preferable that the volume fraction of oxygen gas ($O_2$ gas) with respect to shield gas is set to be within a range of 1 volume % to 3 volume %. In addition, in order to prevent the welding phenomenon from becoming unstable, for example, it is preferable that the volume fraction of carbonic acid gas ($CO_2$ gas) with respect to shield gas is set to be within a range of 5 volume % to 10 volume %. In addition, for example, it is more preferable that the volume fraction of oxygen gas ($O_2$ gas) with respect to shield gas is set to be within a range of 2 volume % to 3 volume %.

A lap fillet arc welding joint is manufactured as described above.

Here, a case where two steel sheets are prepared has been described as an example. However, a lap fillet arc welding joint may be manufactured by causing one end side of one steel sheet to serve as a bent steel sheet and the other end side to serve as a lap steel sheet.

In the lap fillet arc welding joint according to the present embodiment as described above, the weld length L1 is set to be two times or more of the sheet thickness $t_{PL}$ of the lap steel sheet 420. In addition, the amount of deviation between the central axes 510 and 520 of the bent steel sheet 410 and the lap steel sheet 420 in the sheet thicknesses is set to be ½ times or less of the average value of the sheet thickness $t_{PB}$ of the bent steel sheet 410 and the sheet thickness $t_{PL}$ of the lap steel sheet 420. In addition, the position of the weld toe portion 530 of the bent steel sheet 410 in the Z-axis direction is set as the position on the sheet surface of the non-inclined region of the bent steel sheet 410 and is set to be within a range from the position on the sheet surface on a side where is formed the weld bead 430 to the position of the central axis 510 of the non-inclined region of the bent steel sheet 410 in the sheet thickness.

When a lap fillet arc welding joint is configured in this manner, even in a state where a gap is present between steel sheets, it is possible to provide a lap fillet arc welding joint having small stress concentration in the weld toe portions 530 and 540 and the root portions 550 and 560.

Particularly, it is possible to reduce the stress concentration in the root portion 560 of the lap steel sheet 420 in which a significant stress concentration is generated in a general lap fillet arc welding joint. Thus, the fatigue strength of a welding member can be improved. For example, a suspension member of an automobile can be manufactured by performing lap fillet arc welding with respect to a high strength steel sheet. Accordingly, weight reduction in a vehicle body can be achieved.

In addition, in the lap fillet arc welding joint according to the present embodiment, the bent angle α is set to be within a range of 10° to 35°, the gap g between the root portions 550 and 560 is set to be equal to or smaller than the sheet thickness $t_{PL}$ of the lap steel sheet 420, and the joint portion length L1 is set to be four times or less of the sheet thickness $t_{PL}$ of the lap steel sheet. When such a lap fillet welding joint is manufactured, the position $(x/t_{PL})$ of the lap steel sheet is set to be within a range of 1.8 to 5, and the conditions of "$x/t_{PL} \leq -0.125 \times \alpha + 6.875$" and "$x/t_{PL} \geq -0.2 \times \alpha + 5$" are satisfied. In this manner, welding can be performed with one pass, and the number of times of welding (the number of passes) can be reduced.

In the present embodiment, a case where the metal sheet is a steel sheet has been described as an example. However, the conditions described above are the same as the case of using a metal sheet other than a steel sheet. Therefore, the metal sheet is not limited to a steel sheet.

A lap fillet arc welding joint according to another embodiment of the present invention is a lap fillet arc welding joint having a first metal sheet, a second metal sheet, and a weld bead which is a joint portion of the first metal sheet and the second metal sheet. A region of the first metal sheet on one end side is bent. The position of the tip end of the bent region of the first metal sheet in a first direction overlaps any position of the region of the second metal sheet on one end side in the first direction. The first direction is a direction perpendicular to the direction along the weld line of the weld bead and the sheet thickness direction of the second metal sheet. In the region of the second metal sheet on one end side, the position of at least a part of the region of the second metal sheet in a second direction overlaps any position of the bent region of the first metal sheet in the second direction. The second direction is the sheet thickness direction of the second metal sheet. The region of the second metal sheet on one end side and the region connected to the bent region of the first metal sheet are substantially parallel to each other. The weld bead is located in a region including the region between the second metal sheet and the bent region of the first metal sheet. In the second direction, the amount of deviation between the center of a region connected to the bent region of the first metal sheet in the second direction and the center of the region of the second metal sheet on one end side in the second direction is ½ times or less of the average value of the sheet thicknesses of the first metal sheet and the second metal sheet. In a cross section of the lap fillet arc welding joint, the joint portion length is two times or more of the sheet thickness of the second metal sheet. The cross section of the lap fillet arc welding joint is a cross section cut along the first direction and the second direction. The joint portion length is a length from the root portion of the second metal sheet to the weld toe portion of the first metal sheet. The position of the weld toe portion of the first metal sheet in the second direction is in the range from the first position to the second position. The first position is a position on the sheet surface of the region connected to the bent region of the first metal sheet and is a position on the sheet surface on a side where the weld bead is formed. The second position is a position of the center of the region connected to the bent region of the first metal sheet in the second direction.

EXAMPLE

Next, Example of the lap fillet arc welding joint according to the present invention will be described.

As a steel sheet, a zinc-coated steel sheet of 980 MPa class having a sheet thickness of 1.8 mm, and a non-coated steel sheet of 590 MPa class having a sheet thickness of 3.2 mm were used.

When a lap fillet arc welding joint was manufactured by using a zinc-coated steel sheet of 980 MPa class having a sheet thickness of 1.8 mm, a welding wire of 780 MPa class was used as the welding wire. When a lap fillet arc welding joint was manufactured by using a non-coated steel sheet of 590 MPa class having a sheet thickness of 3.2 mm, a welding wire of 490 MPa class or a welding wire of 780 MPa class was used as the welding wire.

As shield gas, mixed gas in which $CO_2$ gas of 3 volume % to 20 volume % was mixed with Ar gas, or mixed gas in which $O_2$ gas of 1 volume % to 2 volume % was mixed with Ar gas was used.

As the welding method, pulsed magnetron welding was adopted. The steel sheet having a sheet thickness of 1.8 mm was welded, while the welding current was 180 A, the welding voltage was 22 V, and the welding rate was within a range of 0.6 to 1.0 m/min. In addition, with respect to the steel sheet having a sheet thickness of 3.2 mm, the welding current was 250 A, the welding voltage was 27 V, and the welding rate was within a range of 0.5 to 1.0 m/min. Burn-through at the time of welding was prevented as much as possible by changing the welding rate, and welding test pieces, in which positions of the toe portion were varied by changing the width of the weld bead were produced.

Lap fillet arc welding joints using a bent steel sheet and general lap fillet arc welding joints were manufactured by performing one pass or two passes of pulsed magnetron welding under the conditions described above. As described above, the lap fillet arc welding joint using a bent steel sheet was a lap fillet arc welding joint in which the end portion of one steel sheet of two steel sheets was bent and which was manufactured by performing lap fillet arc welding of two steel sheets. That is, it was the lap fillet arc welding joint described above in the embodiment. On the other hand, a general lap fillet arc welding joint was a lap fillet arc welding joint manufactured by performing lap fillet arc welding while the sheet surfaces faced each other without bending the end portion of the steel sheet.

Regarding the lap fillet arc welding joints using a bent steel sheet, lap fillet arc welding joints different from each other in the bent angle α, the position x of the lap steel sheet, the amount of deviation between the central axis of the bent steel sheet in the sheet thickness and the central axis of the lap steel sheet in the sheet thickness, and the gap g between the root portion of the bent steel sheet and the root portion of the lap steel sheet were manufactured.

Regarding the general lap fillet arc welding joints, general lap fillet arc welding joints different from each other in the amount of deviation between the central axes of two steel sheets in the sheet thickness (the amount of deviation between the central axes of two steel sheets in the sheet thickness in the Z-axis direction) were manufactured. In addition, regarding the general lap fillet arc welding joints, general lap fillet arc welding joints in which the steel sheets abutted each other in the vicinity of the end portions thereof (with no gap), and general lap fillet arc welding joints in which a gap was present between the sheet surfaces of the steel sheets were manufactured.

Weldability of each of the lap fillet arc welding joints using a bent steel sheet and the general lap fillet arc welding joints was evaluated. If a blowhole was generated, a weld metal flowed out, pores were generated in the weld metal, or welding was not appropriately performed in appearance, weldability was regarded as "poor". On the other hand, if welding was appropriately performed in appearance, weldability was regarded as "good".

For each of the lap fillet arc welding joints having "good" weldability, an axial force fatigue test was performed with the stress rate of 0.1 in accordance with JIS Z 2273. Then, the fatigue limit strength and the position where a crack was generated due to a load exceeding the fatigue limit was investigated.

The value obtained by dividing the test load by the cross-sectional area of the lap steel sheet was regarded as the test stress, the load was repetitively applied two hundred million times, and the stress range in which a crack was no longer generated in the weld was regarded as the fatigue limit. In the description below, the fatigue limit will be sometimes referred to as fatigue strength. Such investigation was not performed for the welding joint having "poor" weldability.

In determination of fatigue strength, the fatigue strength of the experimental example of No. 1 in [Table 1] shown below was adopted as the reference. The determination in a case where the improvement rate of each of Examples with respect to the fatigue strength (the value obtained by dividing the fatigue strength of the experimental example of each number by the fatigue strength of the experimental example of No. 1) was twice or higher was regarded as "passed", and other cases were regarded as "failed".

In addition, regarding the lap fillet arc welding joints using a bent steel sheet, the position of the weld toe portion of the bent steel sheet was confirmed. In a case where the weld toe portion of the bent steel sheet was on the outer surface of the non-inclined region of the bent steel sheet, it was regarded as "excellent". In a case where the position of the weld toe portion of the bent steel sheet in the Z-axis direction was a position closer to the tip end side of the bent steel sheet than the position of the central axis of the non-inclined region of the bent steel sheet in the sheet thickness, it was regarded as "poor".

In a case where the weld toe portion of the bent steel sheet was not at any position thereof (in a case where the position of the weld toe portion of the bent steel sheet in the Z-axis direction is a position between the position of the outer surface of the non-inclined region of the bent steel sheet and the position of the central axis of the non-inclined region of the bent steel sheet in the sheet thickness), it was regarded as "good".

The results are shown in [Table 1] to [Table 3]. In the field of "steel sheet" in [Table 1] to [Table 3], "590" indicates that two non-coated steel sheets of 590 MPa class having a sheet thickness of 3.2 mm were used, and "980" indicates that two zinc-coated steel sheets of 980 MPa class having a sheet thickness of 1.8 mm were used.

In the field of "welding wire", "780" indicates the welding wire of 780 MPa class, and "490" indicates the welding wire of 490 MPa class.

In the field of "shield gas", "Ar+20% $CO_2$" indicates mixed gas in which $CO_2$ gas of 20 volume % is mixed with Ar gas, "Ar+5% $CO_2$" indicates mixed gas in which $CO_2$ gas of 5 volume % is mixed with Ar gas, and "Ar+3% $CO_2$" indicates mixed gas in which $CO_2$ gas of 3 volume % is mixed with Ar gas. "Ar+2% $O_2$" indicates mixed gas in which $O_2$ gas of 2 volume % is mixed with Ar gas, and "Ar+1% $O_2$" indicates mixed gas in which $O_2$ gas of 1 volume % is mixed with Ar gas.

The item "bent angle" indicates the bent angle α of the bent steel sheet.

In the field of "deviation between centers in sheet thicknesses", regarding the experimental examples of No. 4 to 28 ([Table 2] and [Table 3]), the amount of deviation between the central axis of the bent steel sheet in the sheet thickness and the central axis of the lap steel sheet in the sheet thickness is indicated. Regarding the experimental examples of No. 1 to 3 ([Table 1]), the amount of deviation between the central axes of two steel sheets in the sheet thickness is indicated.

The symbol "+" indicates that the central axis of the region of the lap steel sheet on one end side in the sheet thickness deviates to a side (the positive direction side of the Z axis) where the weld toe portion is formed with respect to the central axis of the non-inclined region of the bent steel sheet in the sheet thickness. The symbol "−" indicates that the central axis of the region of the lap steel sheet on one end side in the sheet thickness deviates to a side (the negative direction side of the Z axis) where the root portion is formed with respect to the central axis of the non-inclined region of the bent steel sheet in the sheet thickness.

In [Table 1] to [Table 3], these amounts of deviation are indicated in multiples of the average sheet thickness t (the average sheet thickness between the sheet thickness $t_{PB}$ of the bent steel sheet and the sheet thickness $t_{PL}$ of the lap steel sheet).

In the field of "x position", the position x of the lap steel sheet is indicated. In the field of "g", the gap between the root portion of the bent steel sheet and the root portion of the lap steel sheet in the sheet thickness direction of the lap steel sheet is indicated. In the field of "L1", the weld length is indicated.

In the field of "position of toe portion", the position of the weld toe portion of the bent steel sheet is indicated. In [Table 1] to [Table 3], the positions thereof are indicated as "excellent", "good", or "poor" as described above. In addition, in the field of "position of crack", the position where a fatigue crack is generated first is indicated. The term "root" means that a fatigue crack has generated from the root portion, and the term "toe portion" means that a fatigue crack has generated from the weld toe portion.

In the field of "improvement rate with respect to member in the related art", the fatigue strength obtained with reference to the fatigue strength of the experimental example of No. 1 is indicated (fatigue strength of each number÷fatigue strength of No. 1). The item "determination" indicates the determination reference of the fatigue strength described above.

TABLE 1

| No. | Steel sheet | Welding wire | Shield gas | Bent angle | Deviation between centers in sheet thickness | Position x | x/t | g (mm) | g/t | L1 (mm) |
|---|---|---|---|---|---|---|---|---|---|---|
| 1 | 590 | 490 | — | — | +1t | — | — | 0.0 | 0.0 | — |
| 2 | 980 | 780 | — | — | +1t | — | — | 0.0 | 0.0 | — |
| 3 | 980 | 780 | — | — | +2.3 mm | — | — | 0.5 | 0.3 | — |

| No. | L1/t | Position of toe portion | Position of crack | Fatigue strength (MPa) | Improvement rate with respect to member in the related art | Determination | |
|---|---|---|---|---|---|---|---|
| 1 | — | Excellent | Root | 70 | 1.0 | Standard | Related art |
| 2 | — | Excellent | — | — | — | Failed | Related art |
| 3 | — | Excellent | Root | 65 | 0.9 | Failed | Related art |

TABLE 2

| No. | Steel sheet | Welding wire | Shield gas | Bent angle | Deviation between centers in sheet thickness | Position x | x/t | g (mm) | g/t | L1 (mm) | L1/t |
|---|---|---|---|---|---|---|---|---|---|---|---|
| 4 | 590 | 490 | Ar + 20% $CO_2$ | 35 | +0.5t | 6 | 1.9 | 2.7 | 0.8 | 6.7 | 2.1 |
| 5 | 590 | 490 | Ar + 5% $CO_2$ | 35 | ±0 | 6 | 1.9 | 1.0 | 0.3 | 7.0 | 2.2 |
| 6 | 590 | 490 | Ar + 20% $CO_2$ | 35 | −0.4t | 7 | 2.2 | 0.5 | 0.2 | 8.6 | 2.7 |
| 7 | 590 | 490 | Ar + 2% $O_2$ | 30 | −0.4t | 8 | 2.5 | 0.3 | 0.1 | 9.6 | 3.0 |
| 8 | 590 | 490 | Ar + 20% $CO_2$ | 20 | +0.5t | 8 | 2.5 | 1.5 | 0.5 | 8.3 | 2.6 |
| 9 | 590 | 490 | Ar + 20% $CO_2$ | 10 | +0.5t | 10 | 3.1 | 0.4 | 0.1 | 9.0 | 2.8 |
| 10 | 590 | 490 | Ar + 5% $CO_2$ | 10 | +0.5t | 10 | 3.1 | 0.3 | 0.1 | 10.6 | 3.3 |
| 11 | 590 | 780 | Ar + 20% $CO_2$ | 30 | +0.5t | 7 | 2.2 | 2.4 | 0.8 | 7.2 | 2.2 |
| 12 | 590 | 780 | Ar + 3% $CO_2$ | 30 | ±0 | 7 | 2.2 | 0.8 | 0.3 | 7.7 | 2.4 |
| 13 | 980 | 780 | Ar + 20% $CO_2$ | 30 | +0.5t | 4 | 2.2 | 1.4 | 0.8 | 4.1 | 2.3 |
| 14 | 980 | 780 | Ar + 20% $CO_2$ | 30 | ±0 | 4 | 2.2 | 0.5 | 0.3 | 4.5 | 2.5 |
| 15 | 980 | 780 | Ar + 20% $CO_2$ | 30 | −0.5t | 5 | 2.8 | 0.2 | 0.1 | 5.9 | 3.3 |
| 16 | 980 | 780 | Ar + 20% $CO_2$ | 25 | +0.5t | 5 | 2.8 | 1.3 | 0.7 | 5.0 | 2.8 |
| 17 | 980 | 780 | Ar + 20% $CO_2$ | 20 | +0.5t | 6 | 3.3 | 1.1 | 0.6 | 5.6 | 3.1 |
| 18 | 980 | 780 | Ar + 1% $O_2$ | 20 | +0.5t | 6 | 3.3 | 0.9 | 0.5 | 6.3 | 3.5 |
| 19 | 590 | 490 | Ar + 20% $CO_2$ | 40 | +0.5t | 7 | 2.2 | 4.3 | 1.3 | 7.7 | 2.4 |
| 20 | 980 | 780 | Ar + 20% $CO_2$ | 8 | +0.5t | 8 | 4.4 | 0.4 | 0.2 | 8.5 | 4.7 |
| 21 | 980 | 780 | Ar + 20% $CO_2$ | 30 | ±0 | 7 | 3.9 | 2.3 | 1.3 | 6.1 | 3.4 |

| No. | Position of toe portion | Position of crack | Fatigue strength (MPa) | Improvement rate with respect to member in the related art | Determination | |
|---|---|---|---|---|---|---|
| 4 | Excellent | Root | 160 | 2.3 | Passed | Example of invention |
| 5 | Good | Root | 165 | 2.4 | Passed | Example of invention |
| 6 | Excellent | Toe portion | 200 | 2.9 | Passed | Example of invention |
| 7 | Excellent | Toe portion | 180 | 2.6 | Passed | Example of invention |
| 8 | Excellent | Root | 160 | 2.3 | Passed | Example of invention |
| 9 | Good | Root | 150 | 2.1 | Passed | Example of invention |
| 10 | Excellent | Root | 160 | 2.3 | Passed | Example of invention |
| 11 | Excellent | Root | 180 | 2.6 | Passed | Example of invention |
| 12 | Excellent | Root | 190 | 2.7 | Passed | Example of invention |
| 13 | Excellent | Root | 240 | 3.4 | Passed | Example of invention |
| 14 | Excellent | Root | 290 | 4.1 | Passed | Example of invention |
| 15 | Excellent | Toe portion | 260 | 3.7 | Passed | Example of invention |
| 16 | Good | Root | 240 | 3.4 | Passed | Example of invention |
| 17 | Good | Root | 250 | 3.6 | Passed | Example of invention |
| 18 | Excellent | Root | 280 | 4.0 | Passed | Example of invention |
| 19 | Good | Root | 160 | 2.3 | Passed | Example of invention |
| 20 | Excellent | Root | 230 | 3.3 | Passed | Example of invention |
| 21 | Good | Root | 260 | 3.7 | Passed | Example of invention |

TABLE 3

| No. | Steel sheet | Welding wire | Shield gas | Bent angle | Deviation between centers in sheet thickness | Position x | x/t | g (mm) | g/t | L1 (mm) |
|---|---|---|---|---|---|---|---|---|---|---|
| 22 | 590 | 490 | Ar + 20% $CO_2$ | 20 | +0.8t | 7 | 2.2 | 2.0 | 0.6 | 7.4 |
| 23 | 590 | 490 | Ar + 20% $CO_2$ | 40 | +0.5t | 4 | 1.3 | 1.8 | 0.6 | 4.2 |
| 24 | 590 | 490 | Ar + 20% $CO_2$ | 35 | +0.5t | 10 | 3.1 | 5.6 | 1.8 | 6.7 |
| 25 | 980 | 780 | Ar + 20% $CO_2$ | 20 | ±0 | 11 | 6.1 | 2.3 | 1.3 | 4.3 |
| 26 | 980 | 780 | Ar + 20% $CO_2$ | 8 | +0.5t | 15 | 8.3 | 1.2 | 0.7 | 5.0 |
| 27 | 980 | 780 | Ar + 5% $CO_2$ | 8 | +0.5t | 15 | 8.3 | 1.2 | 0.7 | 6.1 |
| 28 | 980 | 780 | Ar + 20% $CO_2$ | 30 | −0.7t | 6 | 3.3 | 0.5 | 0.3 | 6.3 |

| No. | L1/t | Position of toe portion | Position of crack | Fatigue strength (MPa) | Improvement rate with respect to member in the related art | Determination | |
|---|---|---|---|---|---|---|---|
| 22 | 2.3 | Good | Root | 80 | 1.1 | Failed | Comparative Example |
| 23 | 1.3 | Excellent | Root | 90 | 1.3 | Failed | Comparative Example |
| 24 | 2.1 | Excellent | Not evaluated due to poor welding work | | | | Comparative Example |
| 25 | 2.4 | Good | Not evaluated due to poor welding work | | | | Comparative Example |
| 26 | 2.8 | Failed | Toe portion | 100 | 1.4 | Failed | Comparative Example |
| 27 | 3.4 | Failed | Toe portion | 110 | 1.6 | Failed | Comparative Example |
| 28 | 3.5 | Good | Toe portion | 120 | 1.7 | Failed | Comparative Example |

First, the general lap fillet arc welding joints will be described. No. 1 to 3 are in [Table 1] are the experimental examples of general lap fillet arc welding joints, and all thereof were produced by performing one-pass welding. However, as described below, in the experimental example of No. 2, poor welding work was resulted with one-pass welding, so that a welding joint for determination of fatigue strength could not be manufactured.

As shown in No. 1 of [Table 1], the fatigue strength in a case of performing general lap fillet welding of a non-coated steel sheet of 590 MPa class was 70 MPa. On the other hand, as shown in No. 2, when general lap fillet arc welding of a zinc-coated steel sheet of 980 MPa class was performed while having the amount of deviation between the central axes of two steel sheets in the sheet thickness was set to 1 t, since no gap was present between two steel sheets, a blowhole due to zinc vapor was generated, thereby being resulted in poor welding work.

Therefore, as shown in No. 3, a gap of 0.5 mm was provided between two steel sheets, a blowhole could be prevented. However, the amount of deviation between the central axes of two steel sheets in the sheet thickness became 2.3 mm (=1 t+0.5 mm), and the fatigue strength had a value smaller than that of the experimental example of No. 1. Therefore, it resulted in "failed" under the determination condition described above. That is, in the experimental example of No. 3, although a steel sheet of 980 MPa class was used, it exhibited fatigue strength lower than that of the lap fillet joint of No. 1 using a steel sheet of 590 MPa class.

Therefore, in the present Example, as described above, in both the non-coated steel sheet of 590 MPa class and the zinc-coated steel sheet of 980 MPa class, determination of fatigue strength was performed with reference to the fatigue strength of the experimental example of No. 1 (refer to the field of "improvement rate with respect to member in the related art" in [Table 1] to [Table 3]).

Next, the lap fillet arc welding joints using a bent steel sheet will be described. No. 4 to 28 in [Table 2] and [Table 3] are the experimental examples of the lap fillet arc welding joints using a bent steel sheet. In the experimental examples of No. 4 to 18 and 22 to 28, one-pass welding was performed, and in the experimental examples of No. 19 to 21, two-pass welding was performed. However, as described below, in the experimental examples of No. 24 and 25, poor welding work was resulted with one-pass welding, so that a welding joint for determination of fatigue strength could not be manufactured.

As shown in No. 22, in a case where the amount of deviation between the central axis of the bent steel sheet in the sheet thickness and the central axis of the lap steel sheet in the sheet thickness was +0.8 t (80% of the average sheet thickness t), which was significant, although the fatigue strength was higher than that of the general lap fillet arc welding joints, it resulted in "failed" under the determination condition described above.

As shown in No. 23, in a case where the bent angle α was large and the position x of the lap steel sheet was relatively small, the weld length L1 was smaller than twice the sheet thickness $t_{PL}$ of the lap steel sheet, and it resulted in "failed" under the determination condition described above.

As shown in No. 24 and 25, in a case where the bent angle α was proper but the position x of the lap steel sheet was significant, the gap g between the root portion of the bent steel sheet and the root portion of the lap steel sheet increased to 1.3 times or larger than the sheet thickness $t_{PL}$ of the lap steel sheet. Therefore, a pore defect was generated in the weld toe portion of the lap steel sheet and poor welding work was resulted with one-pass welding.

In addition, as shown in No. 26 and 27, in a case where the bent angle α was small and the position x of the lap steel sheet was significant, the weld toe portion of the bent steel sheet was positioned on the tip end side of the bent region of the bent steel sheet.

In the experimental example of No. 26, the weld toe portion of the bent steel sheet (the weld toe portion 530 in FIG. 5) was on a lower side (the tip end side of the bent region of the bent steel sheet) than the central axis of the non-inclined region of the bent steel sheet in the sheet thickness (the central axis 510 in the sheet thickness in FIG. 5). Therefore, the position of the weld toe portion of the bent steel sheet became poor, and fracture was caused from the toe portion having low fatigue strength. Therefore, it resulted in "failed" under the determination condition described above.

In addition, No. 27 is the experimental example in a case of using mixed gas in which $CO_2$ gas of 5 volume % was mixed with Ar gas as shield gas. Although the weld length L1 increased, the weld toe portion of the bent steel sheet (the weld toe portion 530 in FIG. 5) was on a lower side (the tip end side of the bent region of the bent steel sheet) than the central axis of the non-inclined region of the bent steel sheet in the sheet thickness (the central axis 510 in the sheet thickness in FIG. 5). Accordingly, the position of the weld toe portion of the bent steel sheet became poor. Therefore, the determination reference of fatigue strength resulted in "failed".

As shown in No. 28, in a case where the amount of deviation between the central axis of the bent steel sheet in the sheet thickness and the central axis of the lap steel sheet in the sheet thickness was −0.7 t (70% of the average sheet thickness t), which was significant, although the fatigue strength was higher than that of the general lap fillet arc welding joints, it resulted in "failed" under the determination condition described above.

On the other hand, as shown in No. 4 to 18, in the lap fillet arc welding joints according to the present invention, weldability was "good", and the fatigue strength was also "passed" under the determination condition described above. In addition, as shown in No. 4 to 18, in the lap fillet arc welding joints according to the present invention, it was ascertained that the weldability and the fatigue strength did not depend on the sheet thickness and the kind of a steel sheet, or the welding wire.

Figure 13:
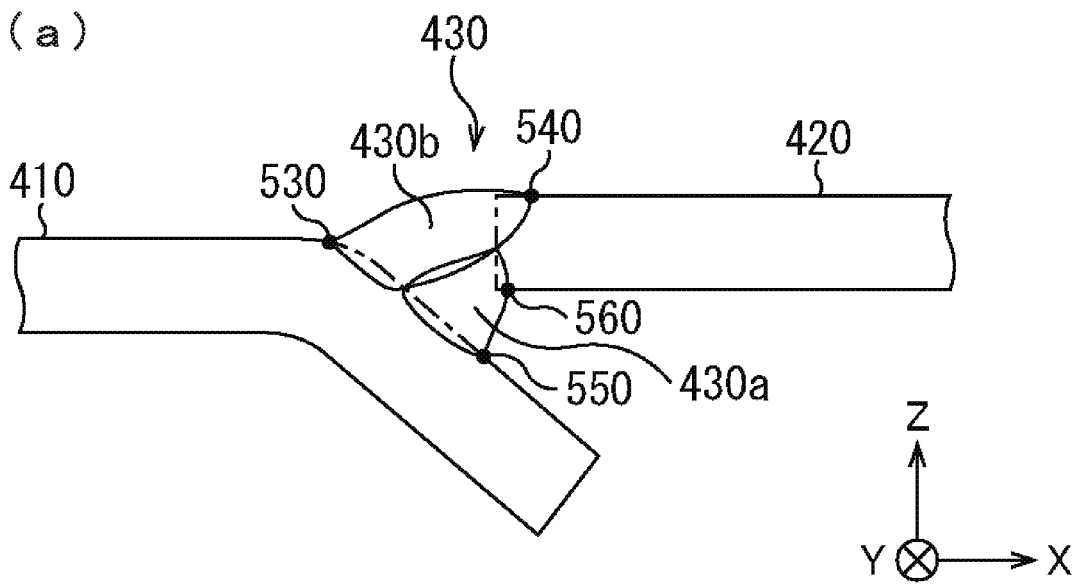
FIGS. 13(a) and 13(b) are schematic views for showing examples of a method for two-pass welding.
Figure 13:
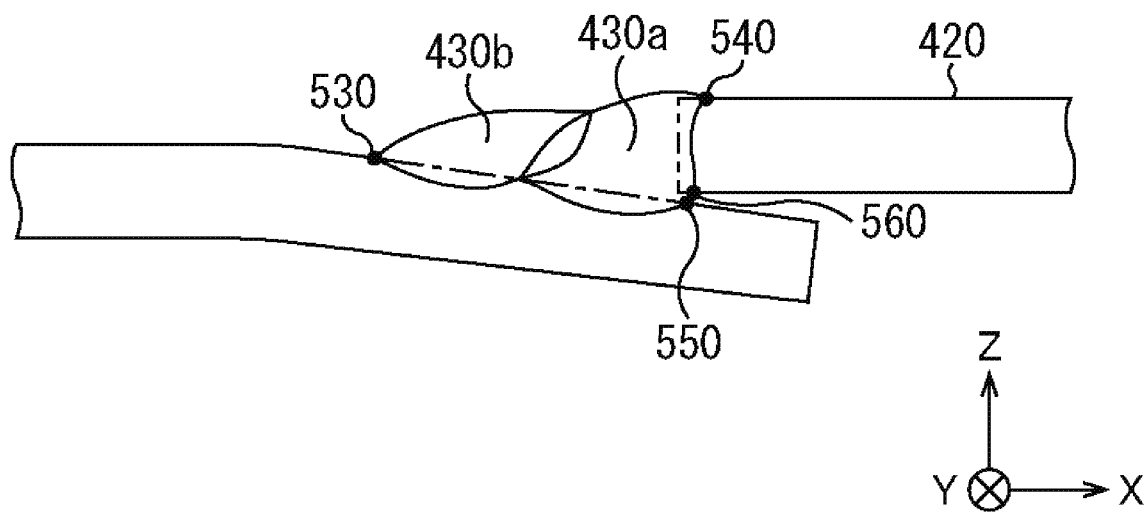

It was difficult for the experimental examples of No. 19 to 21 to perform welding with one-pass welding. Therefore, welding with two-pass welding was performed as shown in FIGS. 13(a) and 13(b). However, all thereof satisfied the regulations of <Range of deviation between central axes in sheet thickness>, <Range of joint portion length>, and <Position of weld toe portion of bent steel sheet> and passed the determination reference of fatigue strength described above.

In the experimental example No. 19 and 21, as shown in FIG. 13(a), a weld bead 430a was formed in the first welding, and a weld bead 430b was formed in the second welding to realize the weld bead 430. In the experimental example of No. 20, as shown in FIG. 13(b), the weld bead 430a was formed in the first welding, and the weld bead 430b was formed in the second welding to realize the weld bead 430.

All of the embodiments of the present invention described above are merely specified examples for performing the present invention, and the technical scope of the present invention should not be restrictively interpreted. That is, the present invention can be performed in various forms without departing from the technical ideas or the main features.

The terms described above may have a correspondence relationship as follows.

For example, "the first metal sheet" corresponds to the bent steel sheet 410.

For example, "the second metal sheet" corresponds to the lap steel sheet 420.

For example, "the first direction" corresponds to the X-axis direction.

For example, "the second direction" corresponds to the Z-axis direction.

For example, "the amount of deviation in the second direction between the center of the region connected to the bent region of the first metal sheet in the second direction and the center of the region of the second metal sheet on one end side in the second direction" corresponds to the amount of deviation between the central axis of the bent steel sheet 410 in the sheet thickness and the central axis of the lap steel sheet 420 in the sheet thickness.

For example, "the cross section of the lap fillet arc welding joint" corresponds to the X-Z cross section of the lap fillet arc welding joint (refer to FIG. 5 and the like).

INDUSTRIAL APPLICABILITY

A lap fillet arc welding joint according to the present invention is suitable for being used to perform lap fillet welding and can be a lap fillet arc welding joint in which stress concentrations in a weld toe portion and a root portion are reduced even in a state where a gap is present between metal sheets. Thus, the present invention has high industrial applicability.

BRIEF DESCRIPTION OF THE REFERENCE SYMBOLS

400: member
410: bent steel sheet
410a: bent region of bent steel sheet on one end side
410b: region connected to bent region of bent steel sheet
420: lap steel sheet
420a: region of lap steel sheet on one end side
430, 440: weld bead
510: central axis of bent steel sheet in sheet thickness
520: central axis of lap steel sheet in sheet thickness
530: weld toe portion of bent steel sheet
540: weld toe portion of lap steel sheet
550: root portion of bent steel sheet
560: root portion of lap steel sheet

The invention claimed is:

1. A lap fillet arc welding joint comprising:
a first metal sheet;
a second metal sheet; and
a weld bead that becomes a joint portion of the first metal sheet and the second metal sheet,
wherein a region of the first metal sheet on one end side is bent,
wherein the weld bead is located in a region including a region between the second metal sheet and the bent region of the first metal sheet, and
wherein in a cross-sectional view in a cross section perpendicular to a weld line of the weld bead,
in a first direction, a position of a tip end of the bent region of the first metal sheet overlaps a region of the second metal sheet on one end side,
in a second direction, an amount of deviation between a central axis of a region connected to the bent region of the first metal sheet and a central axis of the region of the second metal sheet on one end side is ½ times or less of the average value of sheet thicknesses of the first metal sheet and the second metal sheet,
the first direction is a direction perpendicular to a direction along the weld line of the weld bead and a sheet thickness direction of the second metal sheet, and the second direction is the sheet thickness direction of the second metal sheet, a joint portion length, which is a length from a root portion of the second metal sheet to a weld toe portion of the first metal sheet, is two times or more of the sheet thickness of the second metal sheet, a position of the weld toe portion of the first metal sheet in the second direction is in a range from a first position to a second position, the first position is a position on a sheet surface of the region connected to the bent region of the first metal sheet and is a position on a sheet surface on a side where the weld bead is formed, and the second position is a position of the central axis in the second direction in the region connected to the bent region of the first metal sheet, and wherein in the cross-sectional view in the cross section perpendicular to the weld line of the weld bead, a bent angle, which is an angle formed by the bent region of the first metal sheet and a sheet surface of the second metal sheet, is within a range of 10° to 35°, the joint portion length is within a range of two to four times the sheet thickness of the second metal sheet, and a distance between a root portion of the first metal sheet and the root portion of the second metal sheet in the second direction is equal to or smaller than the sheet thickness of the second metal sheet.

2. The lap fillet arc welding joint according to claim 1, wherein a representative value of the joint portion length is two times or more of the sheet thickness of the second metal sheet.

3. The lap fillet arc welding joint according to claim 1, wherein the sheet thicknesses of the first metal sheet and the second metal sheet are within a range of 1.6 mm to 3.4 mm.

4. The lap fillet arc welding joint according to claim 2, wherein the sheet thicknesses of the first metal sheet and the second metal sheet are within a range of 1.6 mm to 3.4 mm.

5. The lap fillet arc welding joint according to claim 1, wherein the first metal sheet and the second metal sheet is a zinc-coated steel sheet.

6. The lap fillet arc welding joint according to claim 2, wherein the first metal sheet and the second metal sheet is a zinc-coated steel sheet.

7. The lap fillet arc welding joint according to claim 3, wherein the first metal sheet and the second metal sheet is a zinc-coated steel sheet.

8. The lap fillet arc welding joint according to claim 4, wherein the first metal sheet and the second metal sheet is a zinc-coated steel sheet.

* * * * *